(12) United States Patent
Cullinane et al.

(10) Patent No.: US 6,446,653 B2
(45) Date of Patent: Sep. 10, 2002

(54) RUPTURE DISK ASSEMBLY

(75) Inventors: Donall Cullinane, Bray; John Daly, Cootehill, both of (IE); Stephen Farwell; Greg Klein, both of Owasso, OK (US); Barry Lowe, Limerick (IE); Mitch Rooker, Sand Springs; John Tomasko, Claremore, both of OK (US); Geof Brazier, Woodbury, MN (US)

(73) Assignee: BS&B Safety Systems, Inc., Tulsa, OK (US)

( * ) Notice: Subject to any disclaimer, the term of this patent is extended or adjusted under 35 U.S.C. 154(b) by 0 days.

(21) Appl. No.: 09/891,195

(22) Filed: Jun. 26, 2001

Related U.S. Application Data

(60) Division of application No. 09/568,505, filed on May 11, 2000, now Pat. No. 6,321,582, which is a continuation-in-part of application No. 09/310,848, filed on May 13, 1999, now Pat. No. 6,178,983.

(51) Int. Cl.$^7$ .............................................. F16K 17/16

(52) U.S. Cl. ................... 137/68.25; 137/68.27; 220/89.2

(58) Field of Search ............... 137/68.25, 68.27, 137/68.26; 220/89.2

(56) References Cited

U.S. PATENT DOCUMENTS

| | | | |
|---|---|---|---|
| 3,526,336 A | | 9/1970 | Wood |
| 3,709,239 A | * | 1/1973 | Morck, Jr. ............... 137/68.27 |
| 3,834,580 A | * | 9/1974 | Ludwig et al. ............ 220/89.2 |
| 3,921,556 A | | 11/1975 | Wood et al. |
| 4,072,160 A | | 2/1978 | Hansen |
| 4,158,422 A | | 6/1979 | Witten et al. |
| 4,211,334 A | | 7/1980 | Witten et al. |
| 4,236,648 A | | 12/1980 | Wood et al. |
| 4,290,276 A | * | 9/1981 | Knowles .............. 137/68.27 X |
| 4,301,938 A | | 11/1981 | Wood et al. |
| 4,388,940 A | | 6/1983 | Powell |
| 4,404,982 A | | 9/1983 | Ou |
| 4,433,791 A | * | 2/1984 | Mulawski ................. 220/89.2 |
| 4,436,218 A | | 3/1984 | Beese |
| 4,441,350 A | | 4/1984 | Short, III et al. |
| 4,492,103 A | | 1/1985 | Nauman |
| 4,512,171 A | | 4/1985 | Mozely |
| 4,513,874 A | * | 4/1985 | Mulawski ................. 220/89.2 |
| 4,576,303 A | * | 3/1986 | Mundt et al. ........ 137/68.27 X |
| 4,597,505 A | | 7/1986 | Mozley et al. |
| 4,669,626 A | | 6/1987 | Mozley |

(List continued on next page.)

OTHER PUBLICATIONS

Assembly Drawing No. JP–0–5002–00, BS&B Safety Systems LTD., dated Jun. 6, 1990, 1 page.
Continental Disc Corporation, Certified $K_R$ Flow Resistance Factors for Pressure Relief Design, 1987.
Pressure Relief Devices, ASME PTC 25–1994, Performance Test Codes, An American National Standard, *The American Society of Mechanical Engieers*, Jan. 31, 1995.

*Primary Examiner*—John Rivell
(74) *Attorney, Agent, or Firm*—Finnegan, Henderson, Farabow, Garrett & Dunner, L.L.P.

(57) ABSTRACT

An improved rupture disk assembly and methods and apparatuses for forming a rupture disk are disclosed. The rupture disk assembly includes a rupture disk having a flange connected to a dome-shaped rupturable portion by a transition area. The rupturable portion includes a structural apex formation at or near the apex of the dome and is configured to rupture when exposed to a fluid having a predetermined pressure. Preferably, a safety member is disposed adjacent the rupture disk. The safety member includes a hinge about which the disk bends when the disk ruptures. The present invention is also directed to an apparatus and method for consistently, accurately, and repeatably forming a structural apex formation in a rupture disk before the formation of the rupture disk dome, during the formation of the rupture disk dome, and after the formation of the rupture disk dome.

13 Claims, 11 Drawing Sheets

U.S. PATENT DOCUMENTS

| | | |
|---|---|---|
| 4,674,530 A | 6/1987 | Bickford |
| 4,759,460 A | 7/1988 | Mozley |
| 4,989,482 A | 2/1991 | Mason |
| 5,005,722 A | 4/1991 | Short, III et al. |
| 5,082,133 A | 1/1992 | Farwell et al. |
| 5,094,266 A | 3/1992 | Ledbetter |
| 5,167,337 A | 12/1992 | Short, III et al. |
| 5,197,622 A * | 3/1993 | Anderson .................. 220/89.2 |
| 5,267,666 A | 12/1993 | Hinrichs et al. |
| 5,305,775 A | 4/1994 | Farwell |
| 5,368,180 A | 11/1994 | Farwell et al. |
| 5,411,158 A | 5/1995 | Kays et al. |
| 5,460,026 A | 10/1995 | Schafer |
| 5,467,886 A * | 11/1995 | Hinrichs .................... 220/89.2 |
| 5,558,114 A | 9/1996 | Strelow |
| 5,774,372 A | 6/1998 | Berwanger |
| 5,782,259 A | 7/1998 | Ledbetter et al. |
| 5,934,308 A * | 8/1999 | Farwell .................... 137/68.26 |
| 5,996,605 A * | 12/1999 | Farwell ............... 137/68.26 X |
| 6,006,938 A * | 12/1999 | Mozley et al. ............. 220/89.2 |
| 6,178,796 B1 | 1/2001 | Hellgren |

* cited by examiner

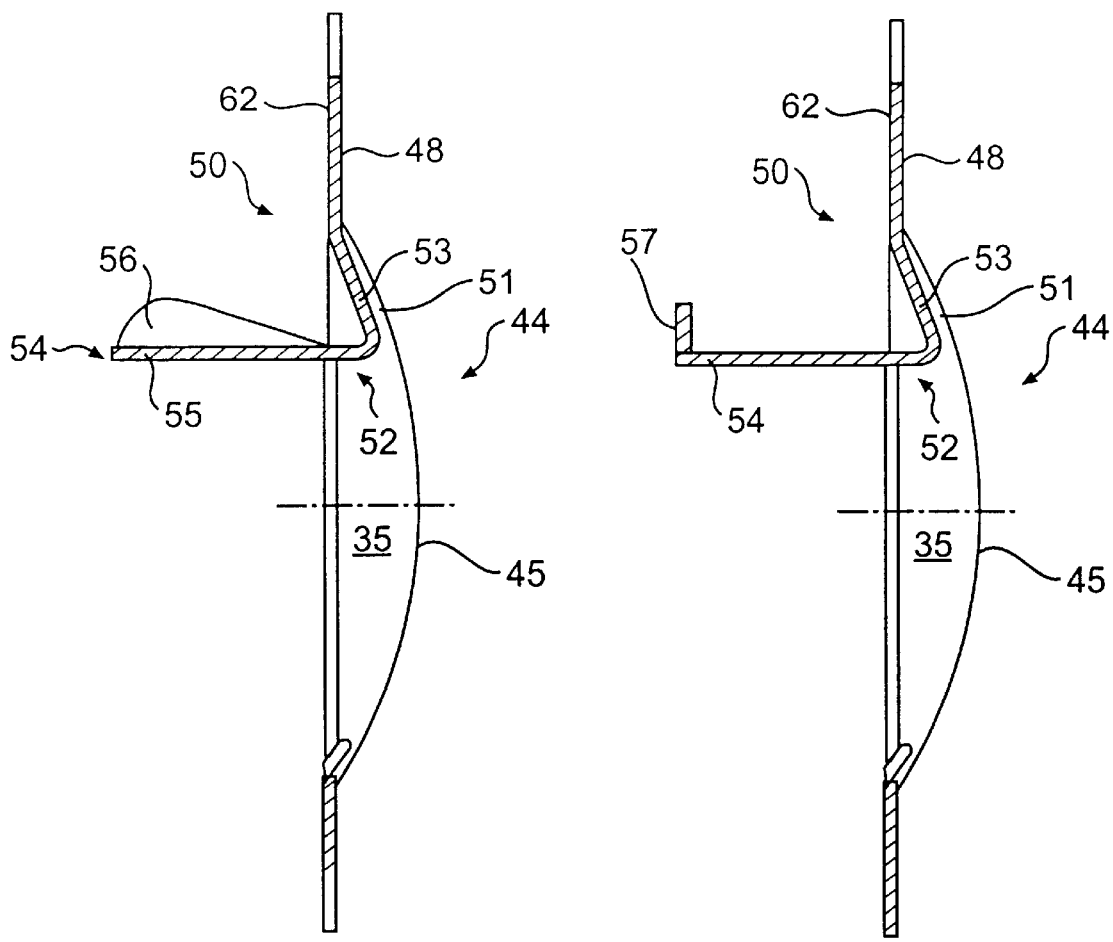
FIG. 3a  FIG. 3b
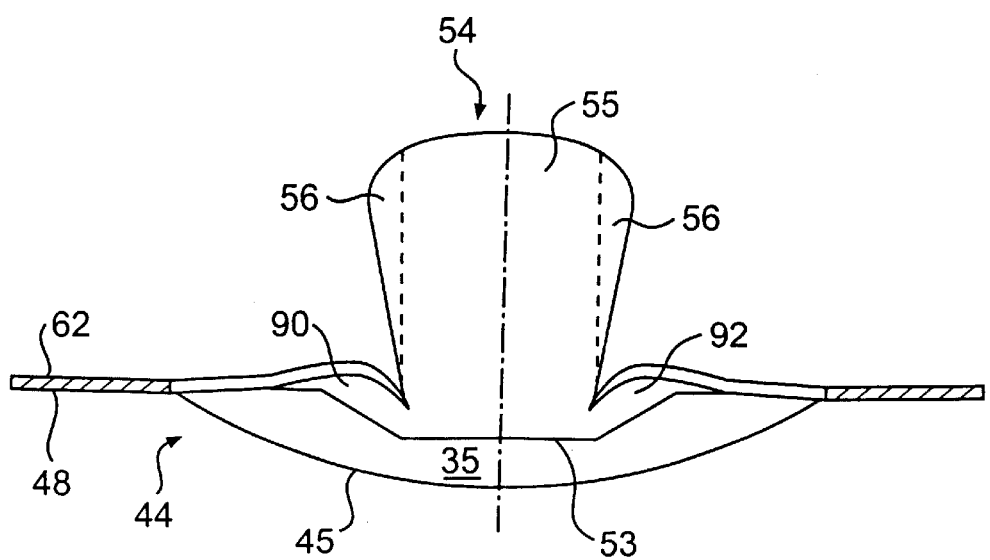
FIG. 4

RUPTURE DISK ASSEMBLY

RELATED APPLICATIONS

This is a division of application Ser. No. 09/568,505, filed May 11, 2000, now U.S. Pat. No. 6,321,582 which is a continuation-in-part of Ser. No. 09/310,848, filed May 13, 1999 now U.S. Pat. No. 6,178,983 all of which are incorporated herein by reference.

BACKGROUND OF THE INVENTION

This invention relates to pressure relief systems. More particularly, the present invention relates to an improved rupture disk assembly for a pressure relief system and to apparatuses and methods for forming and manufacturing rupture disks.

Pressure relief assemblies are commonly used as safety devices in systems containing pressurized fluids in gas or liquid form. A pressure relief assembly will vent fluid from the system when the pressure in the system reaches an unsafe level. A number of emergency conditions, including fire and system failure, can create dangerous pressure levels, which require immediate relief to preserve the safety of the system.

Generally, a pressure relief assembly includes a rupture disk that is sealed between a pair of support members, or safety heads. The pressure relief assembly is then typically clamped, or otherwise sealingly disposed, between a pair of conventional pipe flanges in the pressurized system. One of the pipes conducts pressurized fluid to one side of the pressure relief assembly and the other pipe provides an outlet to a safety reservoir or may be open to the environment. The support members include a central opening that exposes a portion of the rupture disk to the pressurized fluid in the system. The exposed portion of the rupture disk will rupture when the pressure of the fluid reaches a predetermined differential pressure between the inlet and outlet sides. The ruptured disk creates a vent path that allows fluid to escape through the outlet to reduce the pressure in the system.

Rupture disks typically have a dome shape and can be either forward acting or reverse acting. In a forward acting disk, the concave side of the dome faces the pressurized fluid, placing the material of the disk under tension. In a reverse acting disk, the convex side of the dome faces the pressurized fluid, placing the material of the disk under compression. In the reverse acting disk (also known as a reverse buckling disk), when the pressure of the fluid exceeds the predetermined level and the material of the disk structure cannot withstand the pressure, the dome of the disk will buckle and begin to reverse. This reversal, or buckling, will begin at a particular point on the disk, known as the point of initial reversal. As the disk continues to reverse, the material of the disk is torn by an opening means to create the vent path to release the pressurized fluid.

Both types of disks commonly include score lines (areas of weakness) to facilitate the opening of the disk. In a reverse buckling disk, the disk will tear along the score line when the disk is reversing. Selected portions of the disk are usually left unscored, acting as a hinge area, to prevent the disk from fragmenting upon bursting and escaping along with the pressurized fluid. Additionally, pressure relief assemblies are known that include safety members to assist in opening the disk and to absorb the energy created by the bursting of the disk to attempt to prevent the disk from fragmenting.

In an emergency situation, where the system pressure becomes unsafe, it is important to reduce the pressure as quickly as possible. The American Society of Mechanical Engineers (ASME) code establishes minimum performance requirements for fluid flow rates through pressure relief systems. The size and shape of the opening created when the disk bursts is a limiting factor on the rate at which fluid can escape the system. A burst disk having a large, unobstructed opening will perform better than a burst disk having a small, obstructed opening because the velocity head loss (i.e. pressure drop) over the large, unobstructed opening will be lower than the velocity head loss over a smaller or obstructed opening. The lower velocity head loss translates to a lower flow resistance ($K_r$) and, thus, a greater flow rate through the disk.

Adjusting different facets of the disk design, including the size of the rupturable portion of the disk and the location of the score line, can control the size and shape of the opening created when the disk bursts. A larger disk has the potential to create a larger opening.

Another factor affecting flow resistance is the nature of the fluid in the pressurized system. It has been found that rupture disks open differently depending on the nature of the fluid in the system. Typically, a disk burst in a gas environment will open more fully than a disk burst in a liquid environment. Thus, to meet desirable flow resistance performance requirements, the design of a disk may have to be different if the disk is being used in a liquid application, even if the liquid is at the same pressure as a similar gas application.

An additional factor of disk design that affects flow resistance is the thickness of he rupturable portion of the disk. A disk made of a thinner material will bend easier than a disk made of a thicker material. Thus, for disks rupturing at the same fluid pressure, a thinner disk is more likely to completely open and create a large, unobstructed opening than a corresponding thicker disk.

However, a disk made of a thinner material is more susceptible to damage than a thicker disk. Any damage to the rupture disk could alter the actual burst pressure of the disk. This is particularly an issue in low pressure, reverse buckling disks where the disk material must be thin to burst at the desired low pressure. The thinner, low pressure disks are more likely to be damaged during installation, which may compromise the structural integrity of the disk and cause the disk to reverse at a pressure significantly less than the desired rupture pressure. In these situations, the material of the disk does not tear as expected and the disk may completely reverse without tearing. The reverse buckling disk then acts like a forward acting disk and the fluid pressure places the material of the disk in tension. Because the tensile strength of the disk material is greater than the corresponding compressive strength, the disk may not tear to create the vent path until the pressure of the system significantly exceeds the desired rupture pressure. This over-pressure condition could result in damage to the system that the rupture disk was intended to prevent.

Rupture disks are rated by their performance in a damaged condition. This rating is generally known as the damage safety ratio of the disk and is determined by dividing the actual pressure at which a damaged disk ruptures by the desired, or rated, rupture pressure of the disk. A damaged disk with a damage safety ratio of 1 or less will burst at the desired rupture pressure, or before the pressurized fluid reaches the desired pressure, thereby preventing any damage to the system.

Another important performance rating of a rupture disk is the burst accuracy of the disk. There are variations in materials, manufacturing, and installation that may result in any given two disks in a manufacturing lot of seemingly identical disks not bursting at the same pressures. Thus, there is typically a variation in actual burst pressure among disks having the same rated pressure. With current rupture disk design and manufacturing methods, rupture disks will typically burst at a pressure that is less than 5% of the rated pressure or less than 2 psig when the rated pressure is below 40 psig. Thus, to prevent premature disk rupture and to provide a safety margin, the standard operating pressure of a system should not exceed 90% of the rated pressure of a rupture disk used in the system.

In light of the foregoing, there is a need for a pressure relief assembly that provides a low flow resistance $K_r$ in both liquid and gas applications. There is further a need for rupture disks that have an accurate and repeatable burst pressure and thus can be used in a high operating capacity. There is still further a need for a rupture disk having a low damage safety ratio so that an inadvertently damaged reverse buckling disk does not create a potentially dangerous over-pressure situation in either liquid or gas applications.

SUMMARY OF THE INVENTION

Accordingly, the present invention is directed to a pressure relief assembly that obviates one or more of the limitations and disadvantages of prior art pressure relief assemblies. The advantages and purposes of the invention will be set forth in part in the description which follows, and in part will be obvious from the description, or may be learned by practice of the invention. The advantages and purposes of the invention will be realized and attained by the elements and combinations particularly pointed out in the appended claims.

To attain the advantages and in accordance with the purposes of the invention, as embodied and broadly described herein, the invention is directed to an apparatus for indenting a rupture disk that includes an annular flange and a rupturable portion having a domed shape. The apparatus includes a first member and a second member. The first member has an opening and is configured to engage a first side of the rupturable portion of the rupture disk. The second member is disposed on a second side of the rupturable portion of the rupture disk and is aligned with the opening in the first member. The second member engages the rupturable portion at or near the apex of the domed shape and displaces a section of the rupturable portion relative to the first member to thereby create an indentation in the rupturable portion at or near the apex of the domed shape.

In another aspect, the present invention is directed to a method of forming an indentation in a rupture disk that includes an annular flange and a rupturable portion having a domed shape. According to the method, a first side of the rupturable portion is supported with a first member having an opening. A second member aligned with the opening in the first member is engaged with a second side of the rupturable portion at or near the apex of the domed shape to displace a section of the rupturable portion relative to the first member and thereby create an indentation at or near the apex of the rupturable portion of the rupture disk.

In still another aspect, the present invention is directed to a method of forming an indentation in a rupture disk. According to the method, a first side of a rupture disk blank is supported with a first member having an opening. A second member aligned with the opening in the first member is engaged with a second side of the rupture disk blank at or near the center of the rupture disk blank to displace a section of the rupture disk blank relative to the first member, thereby creating an indentation at or near the center of the rupture disk blank. A portion of the rupture disk blank is subject to a pressurized fluid to form said portion of the rupture disk blank into a domed shape such that the indentation is disposed at or near the apex of the domed shape.

According to another aspect, the present invention is directed to an apparatus for forming a rupture disk from a blank. The apparatus includes a clamp configured to fixably secure an outer perimeter of the blank. The clamp has a pathway configured to direct a pressurized fluid against the unclamped portion of the blank. The pressurized fluid acts on the unclamped portion of the blank to displace the unclamped portion of the blank relative to the clamp. A mold having a concave shape receives the unclamped portion of the blank as the unclamped portion is displaced relative to the clamp and forms the unclamped portion of the blank into a domed shape generally corresponding to the concave shape of the mold. A member disposed in the mold engages the unclamped portion of the blank as the unclamped portion is displaced relative to the clamp to thereby form an indentation at or near the apex of the domed shape.

In still another aspect, the present invention is directed to a method of forming a rupture disk from a blank. According to the method, the outer perimeter of the blank is clamped and a pressurized fluid is directed against a central portion of the blank. The pressurized fluid displaces the central portion of the blank relative to the outer perimeter and into a mold having a concave shape. The central portion of the blank is formed into a domed shape that generally corresponds to the concave shape of the mold. A member is engaged with central portion of the blank as the central portion is formed into the domed shape to form an indentation at or near the apex of the domed shape.

According to yet another aspect, the present invention is directed to a rupture disk assembly to be sealed in a pressurized system. The assembly includes a rupture disk that is configured to reverse when exposed to a fluid having a predetermined pressure. The rupturable portion defines an opening therethrough. A liner is disposed between the rupture disk and the pressurized system and is configured to cover and seal the opening in the rupturable portion of the rupture disk.

According to still another aspect, the present invention is directed to a rupture disk to be sealingly engaged with a pressurized system. The rupture disk includes an annular flange and a rupturable portion that is configured to rupture when exposed to a fluid having a predetermined pressure. The rupturable portion has a domed shape with a convex surface and a corresponding concave surface and a structural apex formation disposed at the apex of the dome. The structural apex formation includes a crease formed in at least one of the concave and convex surfaces.

In still another aspect, the present invention is directed to a rupture disk assembly to be sealed in a pressurized system. The rupture disk assembly includes a rupture disk having a dome-shaped rupturable portion that includes a convex surface and a corresponding concave surface forming a dome area. The rupturable portion includes a score line that has a first and a second end and creates a line of weakness along which the rupturable portion will tear when the rupturable portion of the rupture disk is exposed to a fluid above a predetermined pressure. A safety member is disposed adjacent the concave surface of the rupture disk. The safety member includes a flange and a hinge that defines first and second pockets configured to receive the area of the rupturable portion adjacent the respective ends of the score line when the rupture disk ruptures.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one embodiment of the invention and together with the description, serve to explain the principles of the invention. In the drawings.

FIG. 3a is a cross sectional view of the rupture disk and safety member of FIG. 2, taken along line Z—Z;

FIG. 3b is a cross sectional view of an alternative embodiment of the rupture disk and safety member of FIG. 2, taken along line Z—Z;

FIG. 4 is a cross sectional view of the rupture disk and safety member of FIG. 2, taken along line Y—Y;

DETAILED DESCRIPTION

Reference will now be made in detail to the presently preferred embodiments of the present invention, examples of which are illustrated in the accompanying drawings. Wherever possible, the same reference numbers will be used throughout the drawings to refer to the same or like parts. An exemplary embodiment of a pressure relief assembly of the present invention is shown in FIG. 1 and is designated generally by reference number 20.

In accordance with the present invention, there is provided a pressure relief assembly that includes an inlet support member that defines an inlet bore for conducting a pressurized fluid, an outlet support member that defines an outlet bore for relieving the pressurized fluid, and a rupture disk. The rupture disk has a rupturable portion including a convex surface and a corresponding concave surface that defines a dome area. The rupture disk also includes a flange for sealing engagement between the inlet and outlet support members to align the concave surface with the outlet bore and the convex surface with the inlet bore. In the illustrated embodiments, the pressure relief assembly is depicted as a pretorqued pressure relief assembly. It is contemplated, however, that the present invention may also be used with non-pretorqued pressure relief assemblies or as a component of a welded assembly.

Figure 1:
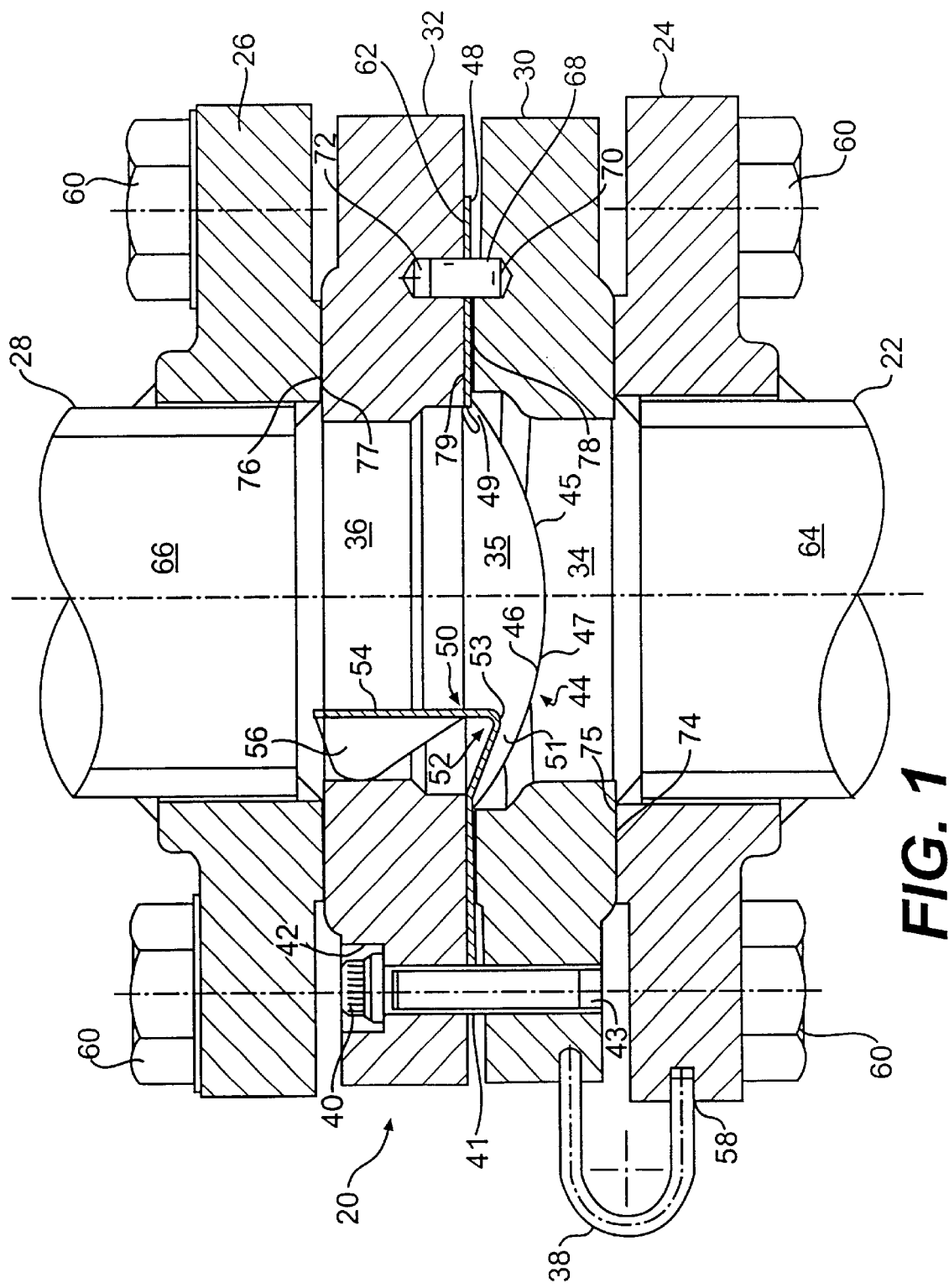
FIG. 1 is a cross sectional view of a pair of support members and a rupture disk according to the present invention positioned between a pair of pipe flanges.

As embodied herein and as illustrated in FIG. 1, pressure relief assembly 20 includes an inlet support member 30 and an outlet support member 32. Inlet support member 30 defines an inlet bore 34 and has a series of internally threaded bolt holes 43 (only one of which is illustrated in FIG. 1) surrounding the inlet bore. Outlet support member 32 defines an outlet bore 36 and has a series of bolt holes 41 (only one of which is illustrated in FIG. 1) that correspond to bolt holes 43 of inlet support member 30. It is contemplated that the inlet and outlet support members may be safety heads, pipe flanges, or any combination of structures capable of sealingly engaging the rupture disk with a pressurized system.

As also shown in FIG. 1, a rupture disk 44 is positioned between inlet support member 30 and outlet support member 32. Rupture disk 44 includes a flange 48 and a rupturable portion 45. Flange 48 is connected to rupturable portion 45 by transition area 49. It is contemplated that the rupture disk and safety member of the present invention can also be utilized in sanitary environments, wherein well-known sanitary fittings will be utilized to engage the rupture disk.

Rupturable portion 45 has a dome shape that includes a concave surface 46 and convex surface 47 that define a dome area designated generally as 35. When flange 48 is engaged with inlet and outlet support members 30 and 32, rupturable portion 45 aligns with inlet bore 34 and outlet bore 36. In a preferred embodiment, convex surface 47 extends into inlet bore 34 and concave surface faces outlet bore 36. It is contemplated, however, that aspects of the present invention may be utilized in forward acting disks where the convex surface extends into the outlet bore.

Figure 2:
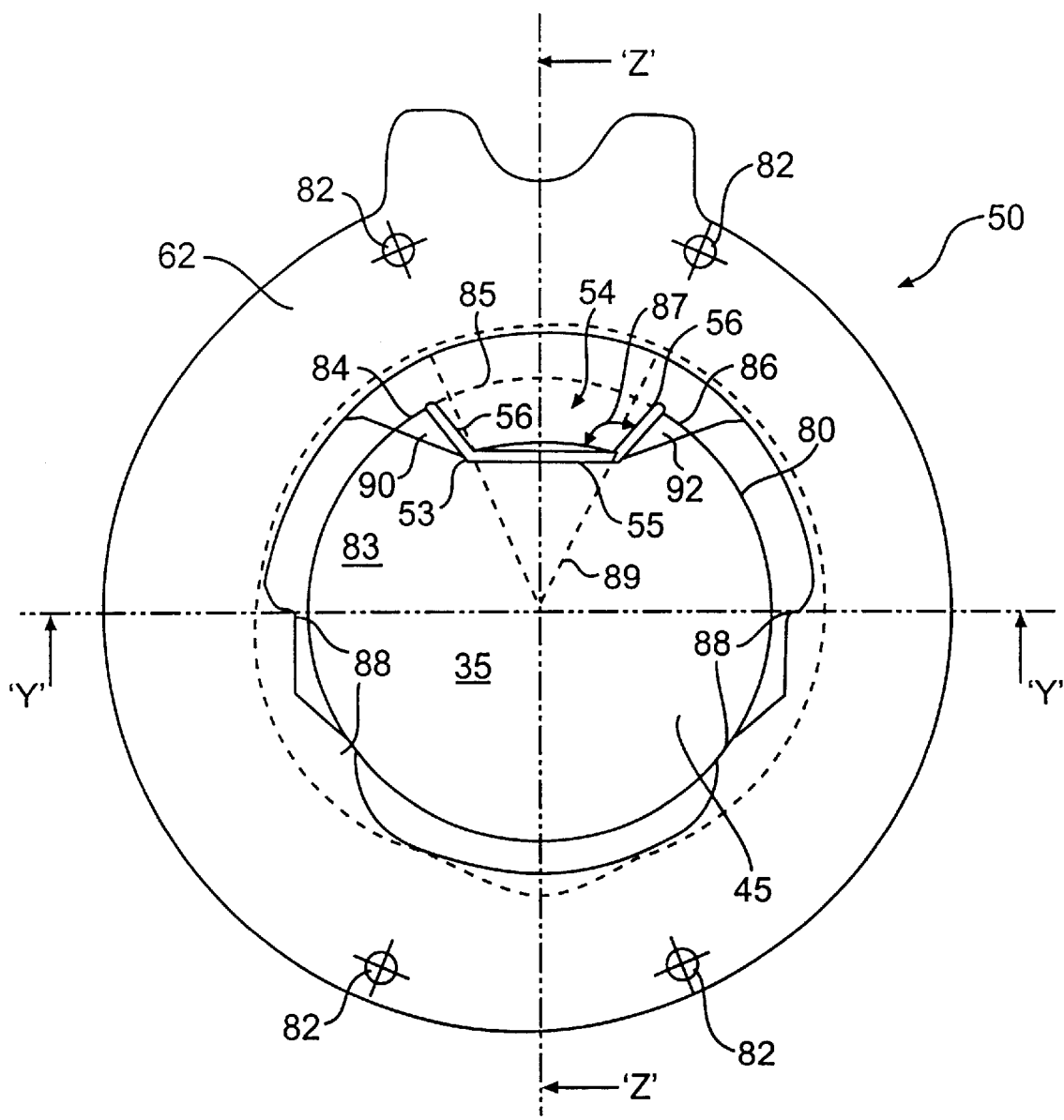
FIG. 2 is a top view of a rupture disk and a safety member according to the present invention.

As illustrated in FIG. 2, rupturable portion 45 includes a score line 80 that has a first end 84 and a second end 86. Preferably, score line 80 transcribes an arc of approximately 300° in the concave surface of the dome-shaped rupturable portion. The present invention can be utilized with score lines of various configurations, such as, for example, an intermittent score line where the score generally transcribes an arc, but includes a series of gaps of unscored material. The score line may also completely circumscribe the rupturable portion of the disk, but include a section where the depth of the score line is shallower than the remainder of the score line. For purposes of the present invention, the points at which the depth of the score line changes would be considered to be the first and second ends of the score line.

As described in greater detail below, score line 80 creates a line of weakness in the rupturable portion along which the disk material will tear when exposed to a fluid having a predetermined pressure. While the presently preferred embodiment provides the score line on the dome itself, the score line may be provided in other locations, such as, for example, the transition area between the dome and the flange of the disk or on the flange itself.

Referring again to FIG. 1, a positioning pin 68 preferably extends between inlet support member 30 and outlet support member 32 and through flange 48 of rupture disk 44. Positioning pin 68 ensures that inlet support member 30 is properly aligned with outlet support member 32 and that rupture disk 44 is properly positioned between support members 30 and 32. When the assembly is properly positioned, inlet bore 34 aligns with outlet bore 36 to create a fluid passageway that is blocked by rupturable portion 45 of rupture disk 44. Additional positioning pins may be placed in a symmetrical or asymmetrical pattern around the support members to further control the relative positions of the rupture disk and support members.

A series of cap screws 40 (only one of which is illustrated in FIG. 1) are disposed through bolt holes 41 to engage internally threaded bolt holes 43. Preferably, bolt holes 41 in outlet support member 32 include a counter bore 42 to receive the head of cap screw 40. The engagement of cap screws 40 with bolt holes 41 and 43 draws outlet support member 32 towards inlet support member 30 to sealingly engage flange 48 of rupture disk 44.

Preferably, inlet support member 30 includes a raised seating surface 78 and outlet support member 32 includes a corresponding seating surface 79 to engage flange 48 of rupture disk 44. It is contemplated that seating surface 78 may include a bite seal, or other similar sealing device, to create a seal with the flange. Alternatively, an o-ring or gasket may be positioned between inlet support member 30 and flange 48 to create the seal.

As is shown in FIG. 1, pressure relief assembly 20 is positioned between a circular inlet pipe 22 and a circular outlet pipe 28. Inlet pipe 22 includes an inlet fluid pathway 64 and an inlet pipe flange 24. Outlet pipe 28 includes an outlet fluid pathway 66 and an outlet pipe flange 26.

Preferably, inlet pipe flange 24 includes a raised surface 74 that engages a corresponding surface 75 on inlet support member 30 and outlet pipe flange 26 includes a raised surface 76 that engages a corresponding surface 77 on outlet support member 26. A series of bolt members 60 draw inlet pipe flange 24 towards outlet pipe flange 26 to create a seal with the pressure relief assembly 20.

Preferably, a U-shaped positioning fixture 38 extending from inlet support member 30 engages an opening 58 in inlet pipe flange 24 to ensure pressure relief assembly 20 is properly oriented between the pipe flanges. U-shaped positioning fixture 38 also ensures that inlet support member 30 is placed adjacent inlet pipe flange 24 and, thus, prevents pressure relief assembly 20 from being installed upside down in the pipe flanges. Pressure relief assembly 20 is properly positioned between inlet pipe flange 24 and outlet pipe flange 26 when inlet fluid pathway 64 aligns with inlet bore 34, outlet bore 36, and outlet fluid pathway 66 to create a fluid passageway that is blocked by rupturable portion 45 of rupture disk 44.

Inlet pipe 22 is connected to a system or vessel (not shown) that contains a pressurized fluid. The fluid may be in either gas or liquid form. Inlet pipe 22 conducts the pressurized fluid to pressure relief assembly 20 and the exposed rupturable portion 45 of rupture disk 44. Rupturable portion 45 is configured to burst when the pressure of the fluid reaches a predetermined level that is indicative of an over-pressurization in the system or vessel. The burst pressure of the disk may be controlled by varying different parameters of the disk design, including, but not limited to, the height of the domed section, the thickness of the disk, and the depth and location of the score line.

When the disk bursts and tears along score line 80, an opening through the disk is created. The opening allows the fluid to flow from inlet bore 34 to outlet bore 36 and into outlet fluid pathway 66, thereby reducing the pressure in the system or vessel.

Outlet fluid pathway 66 may release the fluid to the environment or to a safety reservoir (not shown) depending upon the nature of the fluid in the system or vessel.

In accordance with the present invention, the pressure relief assembly includes a safety member disposed adjacent the concave surface of the rupture disk. The safety member includes a hinge having a knuckle that extends downwardly into the dome area created by the rupturable portion of the disk and extends laterally across the dome area to a point that is inside the area circumscribed by the score line or inside the area circumscribed by an arc connecting the two ends of the score line. A tongue extends direction generally perpendicular to the flange of the safety member. Preferably, the tongue extends past the flange of the safety member, although the end of the tongue may generally align with plane created by the flange. The present invention contemplates that the hinge may be angled with respect to the flange, such that the hinge extends into the outlet bore and towards the outlet support member. It is further contemplated that the hinge may have a generally flat configuration.

As illustrated in FIG. 1, a safety member 50 is positioned between rupture disk 44 and outlet support member 32 and generally supports the transition area of the rupture disk. Preferably, safety member 50 is a separate structure from rupture disk 44 and from outlet support member 32. It is contemplated, however, that safety member 50 may be integral with or connected to either rupture disk 44 or outlet support member 32 with spot welds or in any other manner to keep the structures together.

Safety member 50 includes a flange 62 and a hinge 52. Flange 62 of safety member 50 has substantially the same general shape as flange 48 of rupture disk 44 and is sealed in pressure relief assembly 20 between the rupture disk flange and outlet support member 32. Preferably, as shown in FIG. 2, flange 62 includes a series of holes 82 that may be engaged by positioning pin 68 (referring to FIG. 1).

As shown in FIG. 3a, hinge 52 includes a knuckle 53 and a tongue 54. Knuckle 53 extends from flange 62 into dome area 35. In the illustrated embodiment, knuckle 53 is linear in cross-section. It is contemplated, however, that knuckle 53 may have other cross-sections, such as, for example, a curved cross-section that generally follows the contour of the rupturable portion. Preferably, knuckle 53 does not contact rupturable portion 45 and, thus, leaves a gap 51 between the knuckle and the rupturable portion. It is contemplated, however, that knuckle 53 may contact rupturable portion 45 when the rupture disk is in an unruptured state.

Referring to FIGS. 1 and 2, the outer edge of knuckle 53 extends downwardly into dome area 35. Outer edge 53 also extends laterally across dome area 35 to a point that is inside the area circumscribed by score line 80 or inside the area circumscribed by an arc connecting the ends 84 and 86 of score line 80. The outer edge of knuckle 53 forms a generally straight line about which the rupturable portion will bend when the rupture disk ruptures. In a presently preferred embodiment, the outer edge 53 extends to a point inside, but directly adjacent to the area circumscribed by the score line 80 or the area circumscribed by an arc 85 connecting the two ends of the score line. This embodiment of the hinge prevents fragmentation, yet maximizes the size of the opening created when the disk ruptures, thereby minimizing the pressure drop, or velocity head loss, over the ruptured disk and achieving a low flow resistance, $K_r$.

As shown in FIG. 4, hinge 52 is formed with a first pocket 90 and a second pocket 92. First and second pockets preferably have a concave shape that faces gap 51 (referring to FIG. 3b) between knuckle 53 and rupturable portion 45 of rupture disk 44. Preferably, first and second pockets 90 and 92 are positioned adjacent first and second ends 84 and 86 of score line 80, respectively. It is contemplated that first and second ends 84 and 86 of score line 80 may terminate at a point directly below first and second pockets 90 and 92, respectively (as illustrated in FIG. 2). Alternatively, first and second ends 84 and 86 of score line may terminate at a point that is directly aligned with or just short of first and second pockets 90 and 92, respectively.

As illustrated in FIGS. 1–4, tongue 54 extends away from knuckle 53 and into outlet bore 36. Preferably, as shown in FIG. 2, tongue 54 includes a main linear section 55 with two substantially straight side flaps 56 that project from the main linear section 55 towards the outlet safety member 32. Preferably, as shown in FIG. 2, the angle 87 between side flaps 56 and main linear section 55 is obtuse, although the present invention contemplates that angle 87 may be a right angle or an acute angle. More preferably, angle 87 is greater than the angle between main linear section 55 and a line of radius 89 extending through the corresponding end of main linear section 55. Still more preferably, angle 87 is within the range of about 130° to 160°.

In the embodiment illustrated in FIG. 1, side flaps 56 extend towards outlet safety member 32. Preferably, side flaps 56 are in close proximity to, but do not contact outlet safety member 32 when the disk is in an unruptured state.

In an alternative embodiment, and as illustrated in FIG. 3b, tongue 54 includes a tongue support 57 that projects from the end of the tongue towards outlet support member 32. Preferably, tongue support 57 extends to a point that is in close proximity to, but not in contact with, outlet support member 32. It is contemplated that other embodiments of the support structure will be readily apparent to one skilled in the art.

Referring to FIG. 2, safety member 50 preferably includes a series of stress risers 88. Each stress riser 88 extends away from flange 62 and into dome area 35 of rupturable portion 45 of the rupture disk. Each stress riser 88 terminates in one or more stress concentrating points. Preferably, the stress concentrating points of at least two of the stress risers are aligned with score line 80 in rupturable portion 45 of the rupture disk. The stress concentrating points, as explained in greater detail below, contact the rupturable portion of the rupture disk when the rupture disk reverses to ensure the rupturable portion tears to create a flow path for fluid to escape.

The safety member may include recessed, or "scalloped out," areas between each stress riser. These "scalloped out" areas create gaps in the support of the transition area of the rupture disk. As also explained in greater detail below, the gaps in the support of the rupture disk also help ensure that the rupturable portion tears to create a flow path for fluid to escape. These scalloped out areas may be located at a few selected locations around the safety member annulus or may alternatively be regularly spaced around the entire annulus or substantially the entire annulus (e.g. exclusive of the hinge area).

As described above and referring to FIG. 1, inlet fluid pathway 64 conducts pressurized fluid, in either gas or liquid form, to inlet bore 34 and to rupturable portion 45 of rupture disk 44. In the illustrated embodiment, the pressurized fluid contacts convex surface 47 of rupture disk 44, thereby placing the material of the disk under a compressive force. The magnitude of the compressive force corresponds to the pressure of the fluid. When the pressure of the fluid reaches a predetermined level and the compressive force exceeds the structural and material strength of the rupturable portion of the rupture disk, the dome-shaped section will begin to buckle, or reverse.

Figure 5:
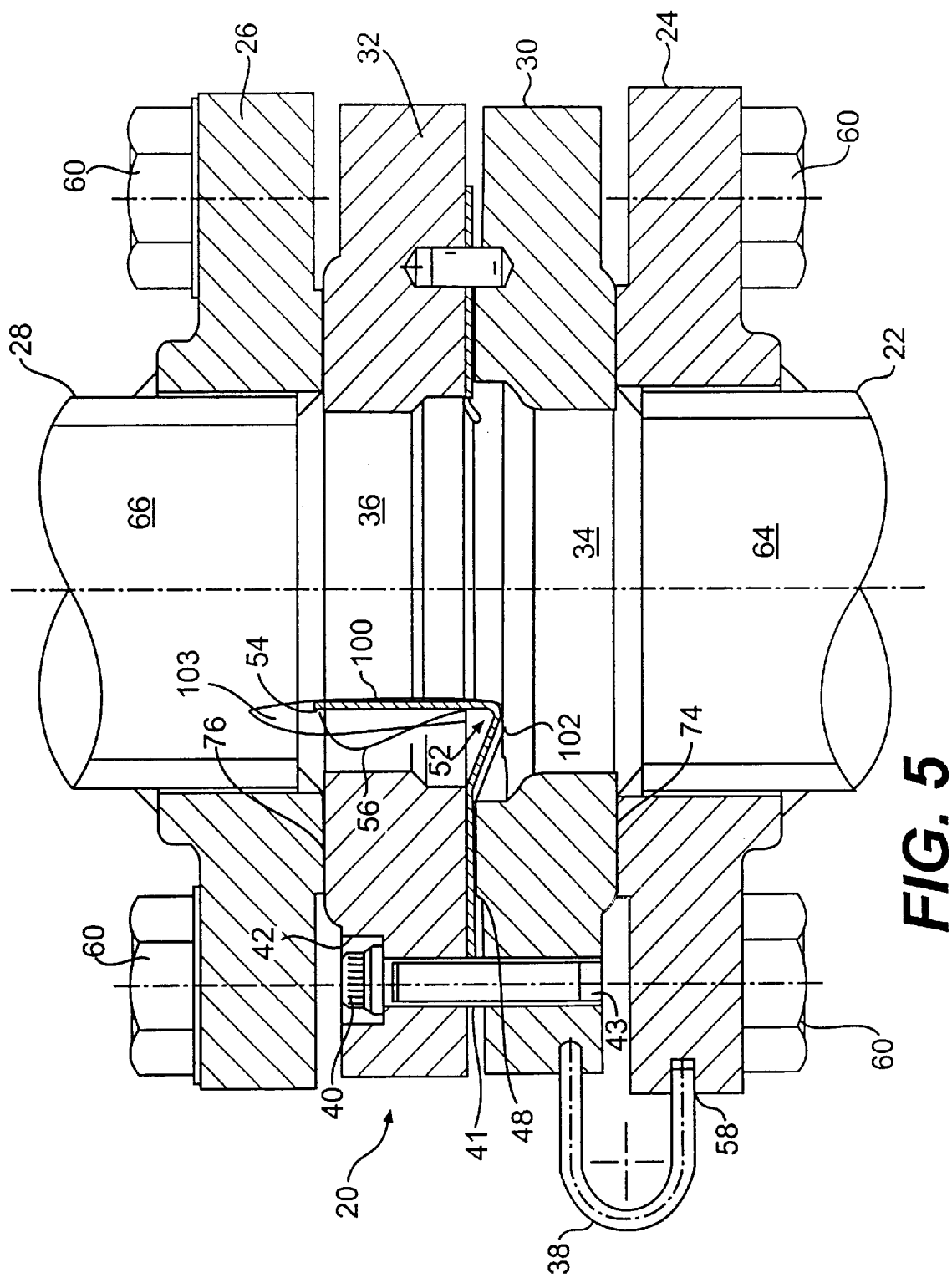
FIG. 5 is a cross sectional view of a pair of support members and a rupture disk according to the present invention positioned between a pair of pipe flanges, illustrating the rupture disk in a burst state.

As illustrated in FIG. 5, the reversal of the disk will cause the disk to tear along score line 80 to form a disk petal 103 that has a shape defined by score line 80 and a disk hinge 102 that connects disk petal 103 to flange 48 to prevent the disk from fragmenting. Under the continued fluid pressure, disk hinge 102 will bend, with respect to the flange, through gap 51 towards safety member 50. Because knuckle 53 of safety member 50 is close to disk hinge 102, the momentum gained by the disk hinge will be relatively small and will be arrested by the eventual contact with the knuckle before the disk petal gains enough momentum to tear away from the disk hinge.

If the disk does not tear along the score line during the initial buckling of the disk, the disk will continue to buckle and reverse under the pressure of the fluid until the disk contacts the stress concentrating points of stress risers 88. The stress concentrating points will increase the stress in the score line 80 to facilitate opening of the disk. In addition, the unsupported gaps of the transition area, as defined by the shape of the "scalloped out" areas of the safety member, create additional forces in the rupturable portion of the disk to ensure the disk opens to create a vent path for the fluid.

After the rupturable portion tears and the disk hinge 102 is supported by knuckle 53, the force of the fluid pressure and the momentum of disk petal 103 will cause the disk to bend around the outer edge of knuckle 53. The petal will continue to bend around knuckle 53 until contacting tongue 54 of hinge 50. The contact of disk petal 103 with tongue 54 will bend the tongue until side flaps 56 contact outlet safety member 32.

The portions of disk petal 103 that extend on either side of tongue 54 will wrap around the tongue and contact side flaps 56.

Depending upon the pressure in the system and the momentum with which the petal is moving, tongue 54 and side flaps 56 may further bend and deform with the contact of disk petal 103 to absorb the kinetic energy of the moving disk petal and stop the movement of the disk petal. Preferably, side flaps 56 are angled with respect to the outlet support member so that they may bend outwardly, or inwardly depending upon angle 87, if the force of contact with the moving petal is great enough. By absorbing the kinetic energy of the moving disk petal, the tongue reduces the overall force on the disk petal, thereby preventing the disk petal from fragmenting. The dimensions of the hinge and, in particular, the dimensions of the knuckle and tongue, are selected so that the hinge will effectively absorb the kinetic energy of the disk petal, while achieving a large and unobstructed flow path through which the pressurized fluid may vent.

In the illustrated embodiment, the portions of the disk petal surrounding the end of the score line will fold into pockets 90 and 92 of hinge 50. Pockets 90 and 92 extend generally away from the flange 62 of the safety member and in the direction of the outlet bore. Pockets 90 and 92 have curved surfaces and are configured to receive the portions of the rupture disk adjacent the respective ends 84 and 86 of score line 80 without creating any additional stress concentrating points. The pockets provide support for the rupture disk material adjacent the ends of the score line. This reduces the tensile forces acting on the ends of score line to prevent the tear in the rupture disk from continuing past the ends of the score line. Thus, the pockets help in preventing the petal from completely separating from the disk. In a preferred embodiment, the disk reverses symmetrically and the disk will wrap around the opposing pockets at the same time thereby preventing the creation of any uneven stresses in either side of the disk hinge.

The opening created by the rupture of the disk will be defined by the shape and location of the score line and by the shape and location of the hinge. In the preferred embodiment, the score line and hinge are configured to maximize the size of the opening. It is contemplated that the shape of the hinge, as defined by the first pocket, the second pocket, and the outer edge of the knuckle, may be a generally straight line Alternatively, as illustrated in FIG. 2, the outer edge of the knuckle may be generally straight and the pockets, disposed on either side of the knuckle, may angle towards the flange of the safety member.

In the preferred embodiment and as illustrated in FIG. 4, the outer edge of the knuckle 53 includes a generally straight section that is located at a point minimally inside the ends of the score line 80. The straight section may be inside, but directly adjacent to the area 83 circumscribed by the score line 80. Alternatively, the straight section may be inside, but directly adjacent to the area transcribed by an arc 85 connecting the ends 84 and 86 of score line 80. The line 85 appears for purposes of illustration in the drawings and does not actually appear on the disk.

When disk petal 103 bends around the outer edge 53 of hinge 50, the bending portion of the petal will preferably form a generally straight line between the ends 84 and 86 of score line 80. Thus, a maximal portion of disk petal 103 will bend out of the fluid passageway. In this manner, the size of the opening created when the disk ruptures is maximized.

Figure 17:
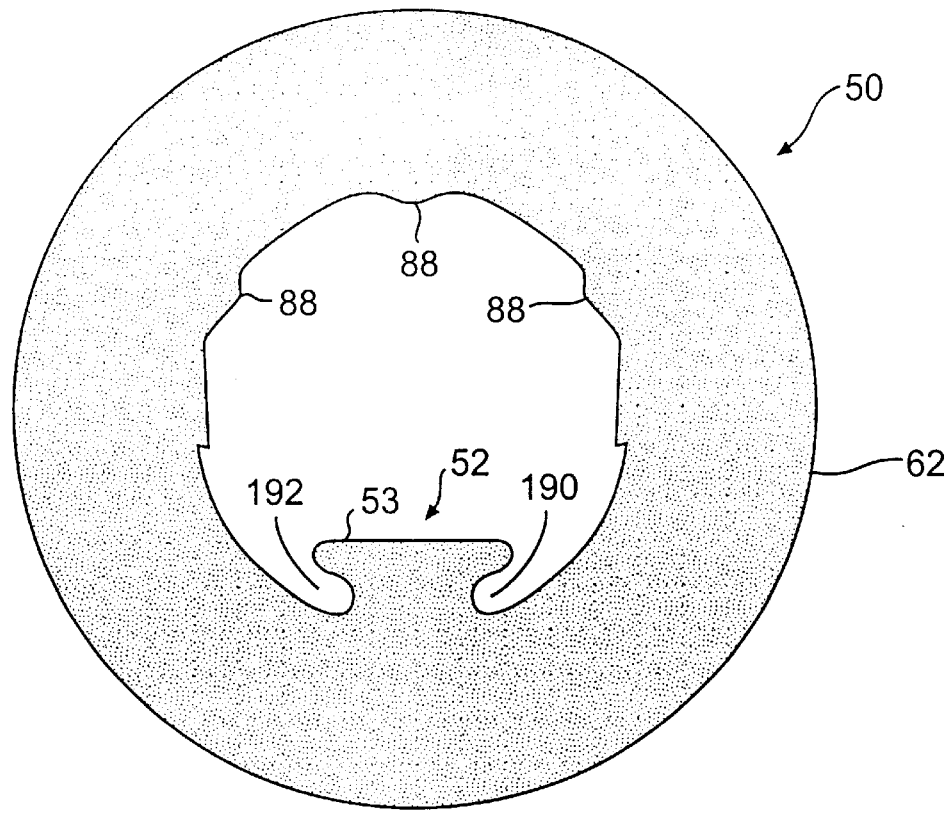
FIG. 17 is a top view of another embodiment of a safety member in accordance with the present invention.
Figure 18:
FIG. 18 is a side view of the safety member of FIG. 17.

In another embodiment and as illustrated in FIGS. 17 and 18, safety member 50 is generally flat. In certain applications, such as, for example, electrical switchgear, the space available for the pressure relief assembly necessitates that the outlet safety head and hinge be replaced with a flat plate that can be bolted or otherwise directly attached to the system. To help prevent a rupture disk from fragmenting in these situations, a hinge may be defined in the flat plate.

As illustrated in FIG. 17, safety member 50 includes a hinge 52. Hinge 52 includes a tongue 53 that defines a generally straight outer section and a pocket 190 and 192 on either side of the hinge. In the illustrated embodiment, hinge 52 lies in the same plane as flange 62. The present invention contemplates, however, that hinge 52 may be bent to extend downwardly into the dome of the rupture disk or upwardly away from the concave side of the disk dome. In addition, the outer edge of the hinge may have a curved shape.

Preferably, flange 62 includes a series of bolt holes (not shown) to allow safety member 50 to be directly connected to the pressurized system. The flange of the rupture disk may be attached to flange 62 of the rupture disk with an adhesive or through welding.

Pockets 190 and 192 are positioned adjacent first and second ends 84 and 86 of score line 80 (referring to FIG. 2). It is contemplated that first and second ends 84 and 86 of score line 80 may terminate at a point directly below first and second pockets 190 and 192. Alternatively, first and second ends 84 and 86 of score line may terminate at a point that is directly below the edge of hinge 53 that defines first and second pockets 190 and 192.

As described in greater detail above, when the rupture disk opens, petal 103 of the rupture disk will bend around hinge 52 to absorb the energy of the disk opening. Hinge 52 may bend with petal 103 as the rupture disk opens to further absorb the energy of the disk opening. Preferably, safety member 50 also includes stress risers 88 that, as also described above, ensure the rupture disk fully opens along the score line.

The portions of the disk petal surrounding the ends of the score line will fold into pockets 190 and 192. This will reduce the magnitude of the stresses acting on the ends of the score line to prevent the tear in the rupture disk from continuing past the ends of the score line and ultimately causing the disk petal to fragment.

Another factor in obtaining a large and unobstructed opening in all service conditions is controlling the initial reversal point of the disk. The initial reversal point of the disk is the point at which the disk initially buckles under the force of the pressurized fluid. In one preferred embodiment, the initial reversal point is positioned at the apex of the dome shaped rupturable portion. This is a central position on the rupture disk and also the position on the rupturable portion that is the furthest from the transition area of the disk. Initiating reversal at this point ensures that the disk reverses in a symmetrical fashion.

A symmetrical disk reversal will result in an enhanced disk opening for both scored and unscored disks. In a scored disk, the symmetrical reversal ensures that an equal force is distributed along the entirety of the score line so that the disk material will tear completely along the score line and fully open. In an unscored disk, where a secondary cutting mechanism, such as perimeter teeth, are used to puncture and open the disk, the symmetrical reversal ensures that the disk material will fold evenly over the secondary cutting mechanism. The secondary cutting mechanism will then cause the disk to fully open and allow the disk petal to bend around the disk hinge and maximize the size of the opening.

In accordance with the present invention, the dome of the rupturable portion includes a structural apex formation. A structural apex formation of the present invention will introduce a structural weakness, such as, for example, a thinning or stretching of the disk material, into the rupturable portion of the rupture disk. The thinning or stretching of the disk material compromises the structural integrity of the disk dome. It has been found that when the disk is subject to a fluid having a certain pressure, the rupture disk will initiate its reversal at the structural weakness. Thus, a properly configured structural apex formation will control the initial reversal point of the disk.

It should also be noted that a structural apex formation will reduce the expected burst pressure of the rupture disk. In other words, a disk that has a structural apex formation will burst at a lower pressure than a similar disk without a structural apex formation. This is noteworthy in that a disk without a structural apex formation must be made from a thinner material in order to achieve the same burst pressure as a disk with a structural apex formation. It has also been found that a correlation exists between the size and shape of the structural apex formation and the amount of reduction in the burst pressure. In general, a larger structural apex formation will result in a greater reduction in burst pressure.

The concept of the structural apex formation offers the potential for great improvement in the reliability and accuracy of rupture disks, particularly those disks configured to rupture at low pressures. The low pressure disks must typically be made from a thin material, which is easily damaged. Any damage to the disk prior to or during installation can dramatically alter the burst pressure of the disk. In addition, any irregularities in the installation, such as misalignment of safety heads or of the disk itself, heat induced irregularities, and bolt or flange insensitivity, can further alter the burst pressure of the disk. Since a disk with a structural apex formation can be made from a thicker material that is less susceptible to these types of problems, the introduction of a structural apex formation will improve the reliability of the rupture disks.

In addition, it has been found that the size and shape of the structural apex formation will be the determining factor in determining the burst pressure of the rupture disk. In other words, the configuration of the structural apex formation will override other design factors, such as, for example, the depth and location of the score line, that previously affected the burst pressure of the rupture disk.

Figure 6:
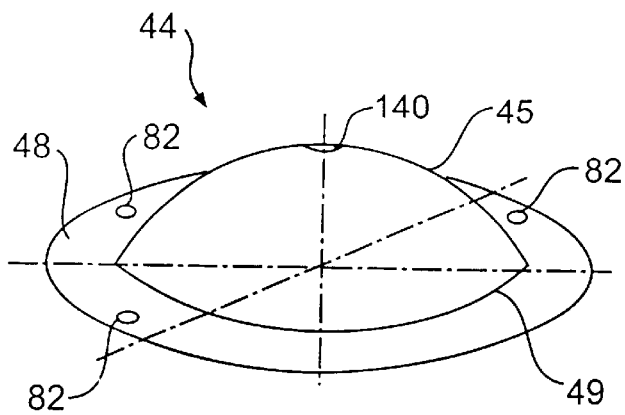
FIG. 6 is a perspective view of a rupture disk having a central indentation according to the present invention.
Figure 7:
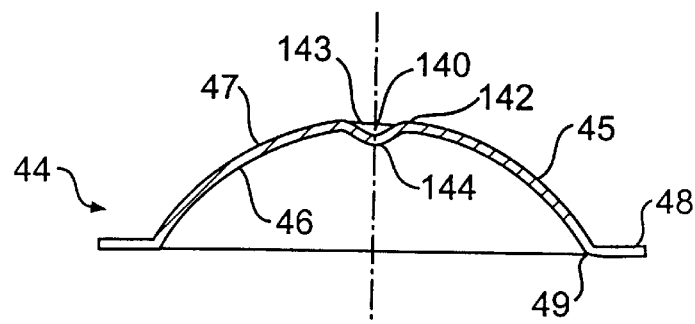
FIG. 7 is a cross sectional view of the rupture disk of FIG. 6.

As shown in FIGS. 6 and 7, the structural apex formation is preferably an indentation 140 located at the apex of the domed shape of the rupturable portion. Preferably, as shown in FIG. 7, indentation 140 is formed in convex surface 47 of the dome, creating a cavity 143 in the convex surface 47 and a corresponding nipple-shaped protrusion/dimple 144 in the concave surface 46. Alternatively, indentation 140 may be formed in the concave surface 46 of the dome, creating a cavity in the concave surface 46 and a corresponding nipple-shaped protrusion in the convex surface 47.

As shown in FIG. 7, indentation 140 includes a circular outer edge 142. Preferably, the distance from the outer edge 142 to transition area 49 is the same at all points along outer edge 142 of indentation 140.

Figure 8:
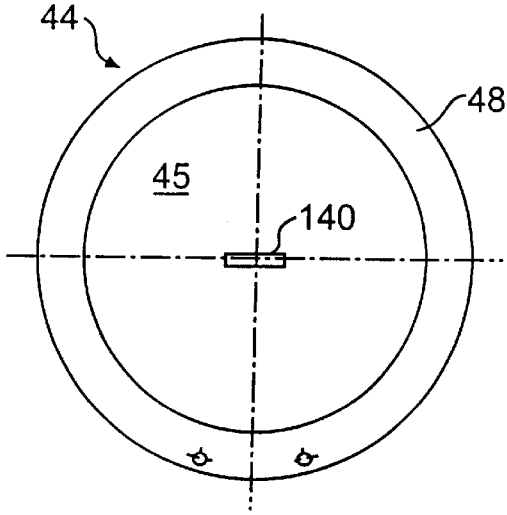
FIGS. 8 and 9 are top plan views of alternative embodiments of central indentations according to the present invention.
Figure 9:
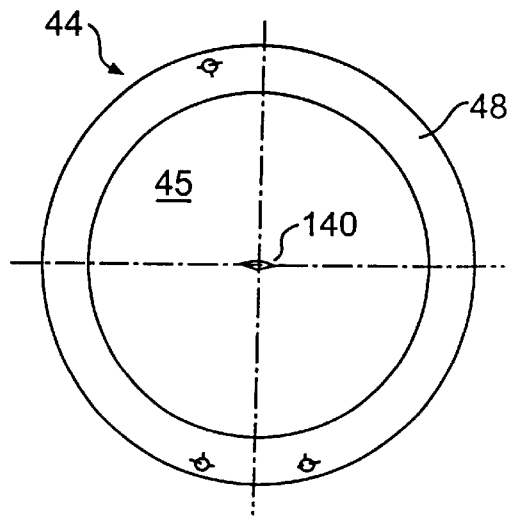

As shown in FIGS. 8 and 9, the indentation may have a variety of shapes. For example, as illustrated in FIG. 8, indentation 140 may be a straight line having a midpoint coinciding with the apex of the dome. In addition, as shown in FIG. 9, indentation 140 may include two straight lines that intersect at the apex of the dome.

It is contemplated that changing the size and shape of the structural apex formation can produce wide variations in the pressure at which a disk of given size and material will burst. For example, a 1" disk made of 0.003" thick material having a small indentation will burst at a higher pressure than a similar disk with a larger indentation. Thus, altering the configuration of the structural apex formation allows a particular size and thickness rupture disk to be adapted to the particular pressure relief needs of a variety of different commercial applications.

It should be noted, however, that to produce a rupture disk that will accurately burst at the desired pressure, the indentation, or other structural apex formation, must be formed in a manner that ensures that the configuration of the structural apex formation is consistent between disks. One method of forming an indentation in a rupture disk is described in U.S. Pat. No. 6,006,938 to Mozely. In the method described therein, the indentation is "free-formed" in that a tool is impacted with the disk as the disk is being formed, without any additional support for the rupture disk. As shown in the test data set forth below, the rupture disks formed according to this method will not consistently burst at a desired pressure. This method, therefore, will not produce a disk with the high level of burst pressure accuracy that is demanded by many commercial applications.

In accordance with the present invention, an apparatus for forming an indentation in the dome of a rupture disk is provided. It is contemplated that the indentation may be formed at any stage in the manufacture of the disk. Accordingly, the present invention is directed to an apparatus for forming an indentation in a formed rupture disk or a rupture disk blank and to an apparatus for forming an indentation in a rupture disk as the dome of the disk is being formed. The indent forming apparatuses allow indentations to be formed in rupture disks in a reliable and consistent manner, which, as set forth in the test data below, results in an improvement in the burst accuracy of the rupture disks.

Figure 10:
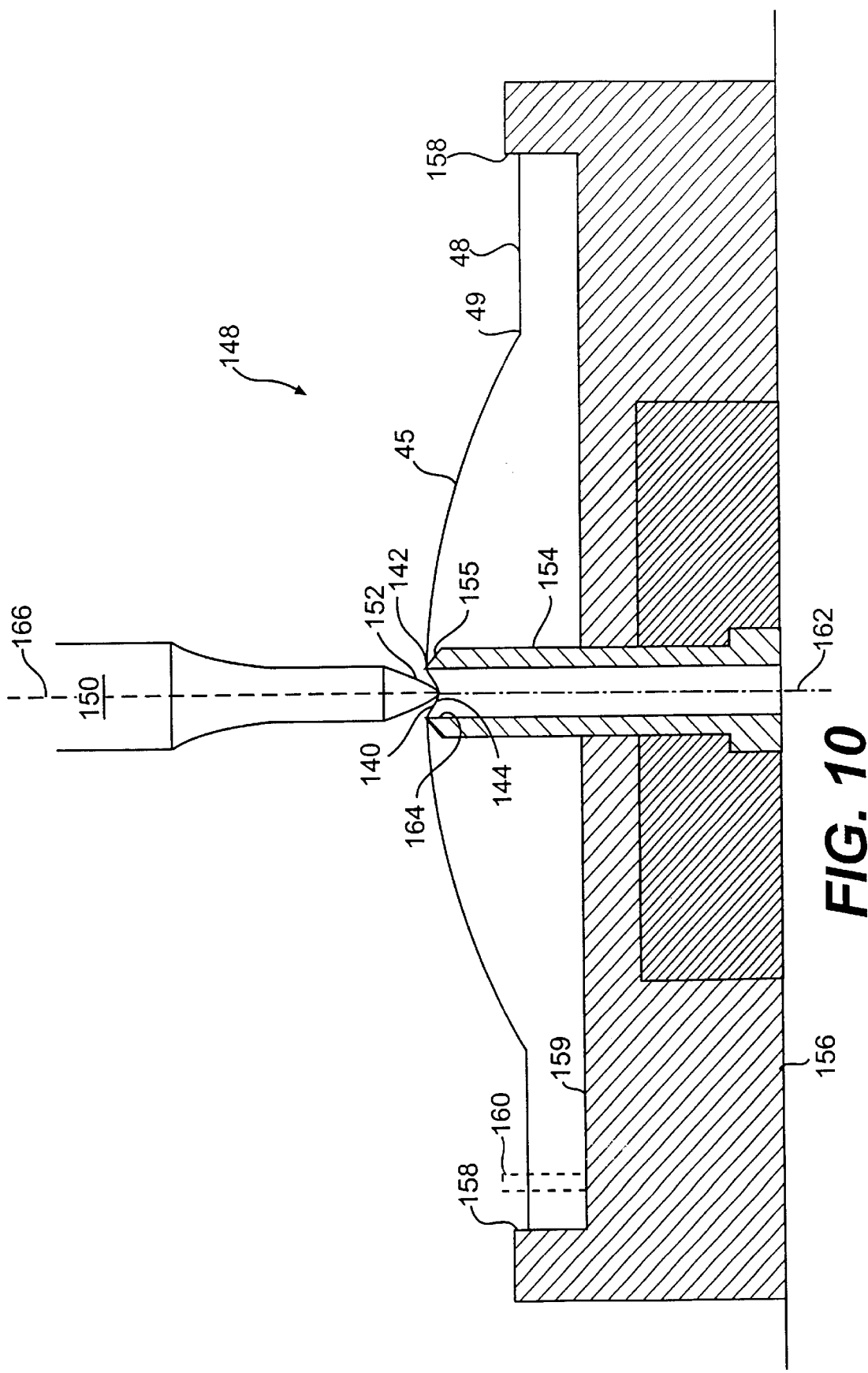
FIG. 10 is a cross-sectional view of an apparatus for creating an indentation in a rupture disk in accordance with the present invention.

As illustrated in FIG. 10, an indent forming apparatus 148 includes a first member, which is preferably an anvil 154. Anvil 154 includes a support surface 155 that defines and opening 164. Preferably, opening 164 is circular, although it is contemplated that opening 164 may have other shapes.

Support surface 155 is configured to engage one side of rupturable portion 45 at the apex of the domed shape such that opening 164 encompasses the apex. It is contemplated that support surface 155 may have a small width such that only a selected portion of rupturable portion 45 is supported. Alternatively, support surface 155 may have a shape that conforms to the contour of the rupture disk dome and extends to the transition area of the disk, such that the entire rupturable portion 45, outside of opening 164, is supported.

Preferably, support surface 155 engages the concave side of the domed shape, although the support surface may engage the convex side of the domed shape. Alternatively, the anvil may engage one side of a rupture disk blank that, as described in greater detail below, will eventually be formed into a rupture disk.

In the illustrated embodiment, the centerline 162 of anvil 154 is aligned with the apex of the domed shape of rupturable portion 45. It is contemplated, however, that centerline 162 may be offset from the apex of the dome shape.

A frame 156 surrounds anvil 154. Frame 156 includes an inner wall 158 that defines a cavity configured to receive flange 48 of the rupture disk. Preferably, the height of inner wall 158 is chosen to ensure that flange 48 does not contact the bottom surface 159 of the cavity so that anvil 154 is the only source of support for the rupture disk. In addition, the diameter of inner wall 158 closely corresponds to the diameter of flange 48. In this manner, inner wall 158 ensures that the rupture disk is correctly aligned on anvil 154.

Frame 156 may include one or more pins 160 (only one pin illustrated in FIG. 10). Pins 160 are configured to engage holes 88 in flange 48 (referring to FIG. 6). The engagement of pins 160 with holes 88 further ensures that the rupture disk is correctly aligned on anvil 154.

The indent forming apparatus 148 also includes a second member, which is preferably a punch 150 that is generally aligned with opening 164 in anvil 154. In the illustrated embodiment, the centerline 166 of punch 150 is directly aligned with the centerline 162 of the anvil. The present invention contemplates, however, that the punch 150 may be offset with respect to the apex and/or the anvil, provided that the punch tip is within the area circumscribed by anvil opening 164.

Punch 150 includes a tip 152 that engages the second side of rupturable portion 45. As punch 150 moves relative to anvil 154, the material of the rupturable portion corresponding to opening 164 is displaced relative to the anvil 154. This forced and controlled displacement causes the disk material along the edge and downsloping section of the indentation to deform, by stretching, thinning, or shearing, relative to the surrounding disk material.

The supporting force of the anvil, which opposes the force of the punch, will create a permanent deformation, such as a crease 200 (referring to FIG. 19) in the surface of rupturable portion 45. This permanent deformation is created as the punch forces a displacement of the material of the rupturable portion relative to the material that is supported by the anvil. Preferably, the concave surface of the disk is supported by the anvil and, thus, the deformation will be formed in at least the concave surface. It is contemplated that the deformation may also be formed in the convex surface or in both the concave and convex surfaces.

The deformation, stretching, thinning, or shearing of the disk material creates the structural weakness in the disk dome. By precisely controlling the movement and location of the punch and anvil, similar amounts of thinning, stretching, or shearing may be induced in successive disks. In this manner, the reliability and accuracy of a series of rupture disks may be maintained at a level required for commercial application.

Preferably, the motion of punch 150 is precisely controlled. In the preferred embodiment, the allowable range of motion of punch tip 152 is governed by a micrometer, which allows for adjustments of 0.0001". In this manner, the depth of the indent, with respect to the apex of the dome, that is created in the rupture disk may be accurately and precisely controlled.

Figure 19:
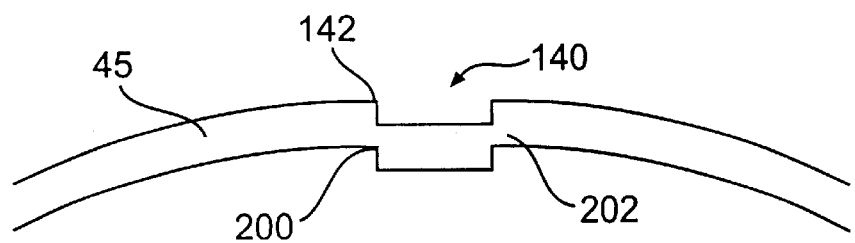
FIG. 19 is a cross-sectional view of a rupture disk having an indentation formed in accordance with an aspect of the present invention.

Alternatively, punch tip 152 and anvil opening 164 may be closely sized so that the disk material is displaced in shear. As illustrated in FIG. 19, indentation 140 formed by shearing rupturable portion 45 results in outer edge 142 having a sharp corner. In addition, a crease 200 is formed on the opposite side of rupturable portion 45, which in the illustrated embodiment is the concave surface. The shearing action of the punch also creates a well-defined thinned area 202 in the rupturable portion 45. This thinned area represents the structural weakness that will coincide with the point of initial reversal.

Figure 11:
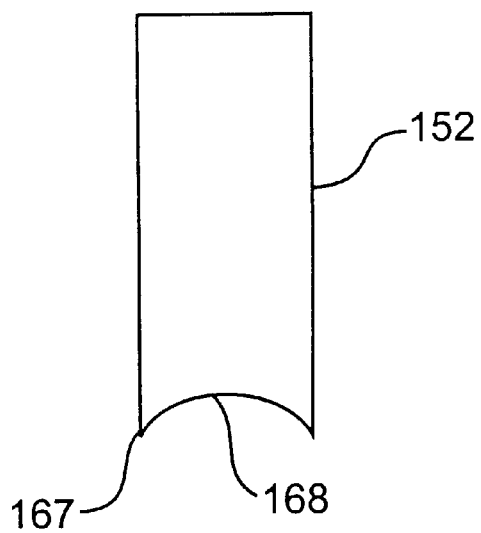
FIG. 11 is a cross-sectional view of another embodiment of a punch tip for creating an indentation in a rupture disk.

As illustrated in FIG. 11, a punch tip 152 for shearing the material of rupturable portion 45 preferably includes a concave surface 168. When punch tip 152 is engaged with rupturable portion 45, edge 167 first engages the curving surface of the rupturable portion. This ensures that each indentation formed in subsequent rupture disks will have essentially the same shape. A flat punch tip will wear down with use and may eventually result in uneven and inconsistent indentations.

Figure 12A:
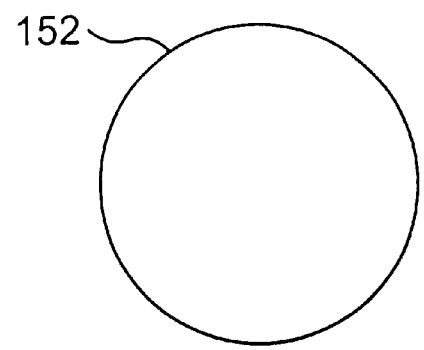
FIGS. 12a–12c are end views of a punch tip according to the present invention.
Figure 12C:
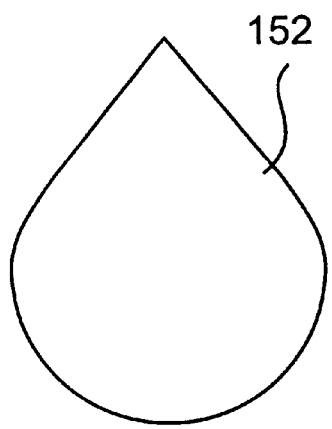
Figure 12B:
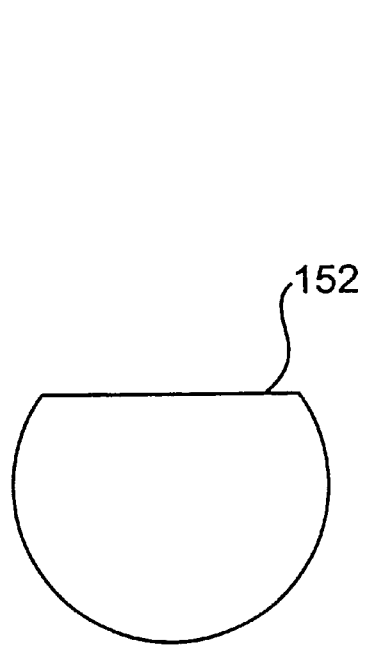

The profile of punch tip 152 may have any shape or size. For example, as illustrated in FIGS. 12a–12c, punch tip 152 may have a circular profile (referring to FIG. 12a), a D-shaped profile (referring to FIG. 12b), or a tear drop profile (referring to FIG. 12c). The shape of anvil opening 164 may or may not be configured to correspond to the profile of punch tip 152. For example, a tear drop shaped punch profile may be used in conjunction with either a circular anvil opening or a tear drop shaped anvil opening.

The present invention contemplates that the configuration of indentation 140 may be varied through any number of variances in the indent forming apparatus. For example, the size and shape of punch tip 152 and anvil opening 164 may be varied alone or in combination to alter the resulting shape of the indentation. In addition, one or both of punch tip 152 and anvil opening 164 may be offset from the apex of the dome shape to further vary the configuration of the indentation. It is expected that continued experimentation with differently shaped and sized punch tips and anvil openings will result in an indentation configuration that provides optimal performance characteristics.

Figure 13:
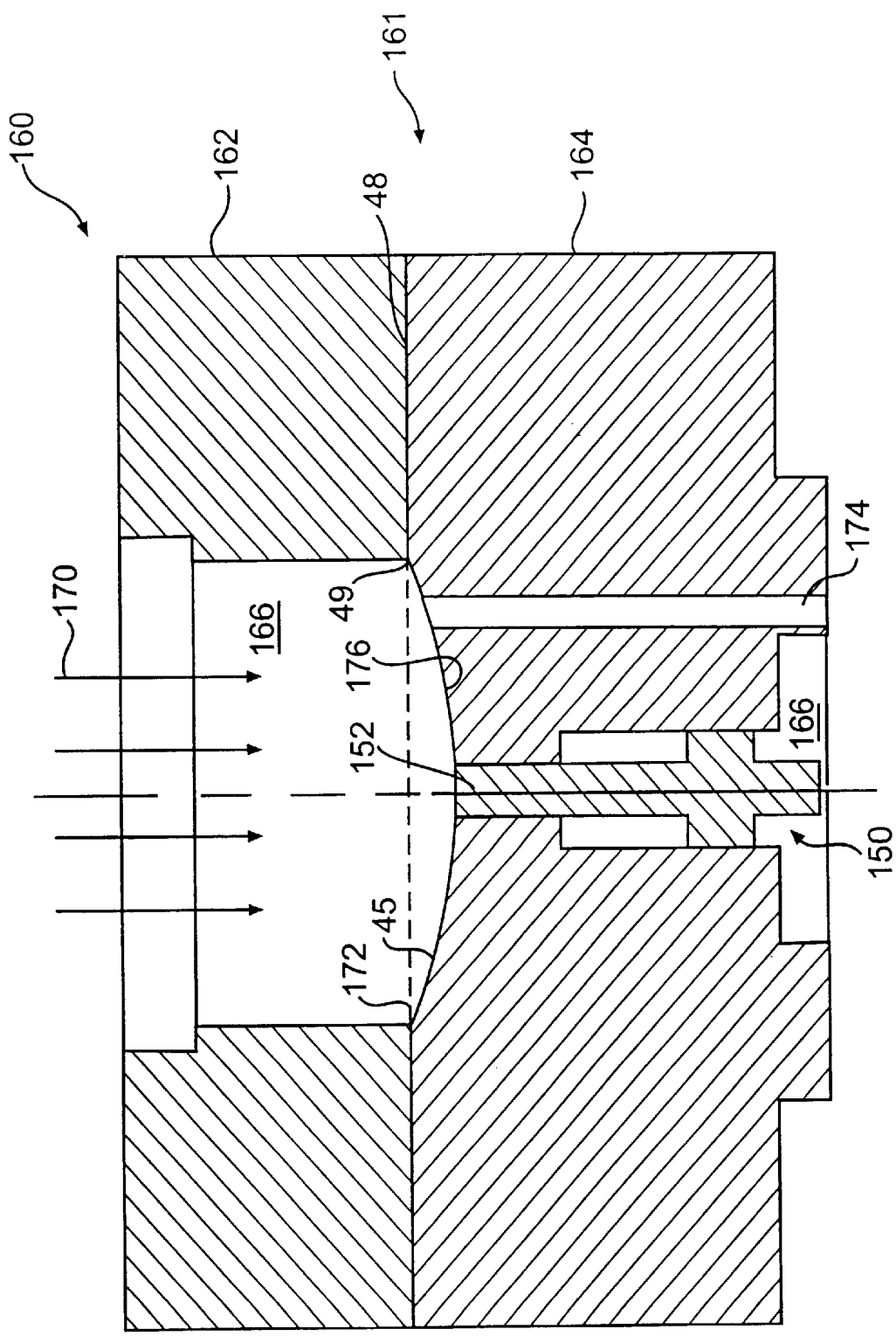
FIG. 13 is a cross-sectional view of another apparatus for creating an indentation in a rupture disk in accordance with the present invention.
Figure 14:
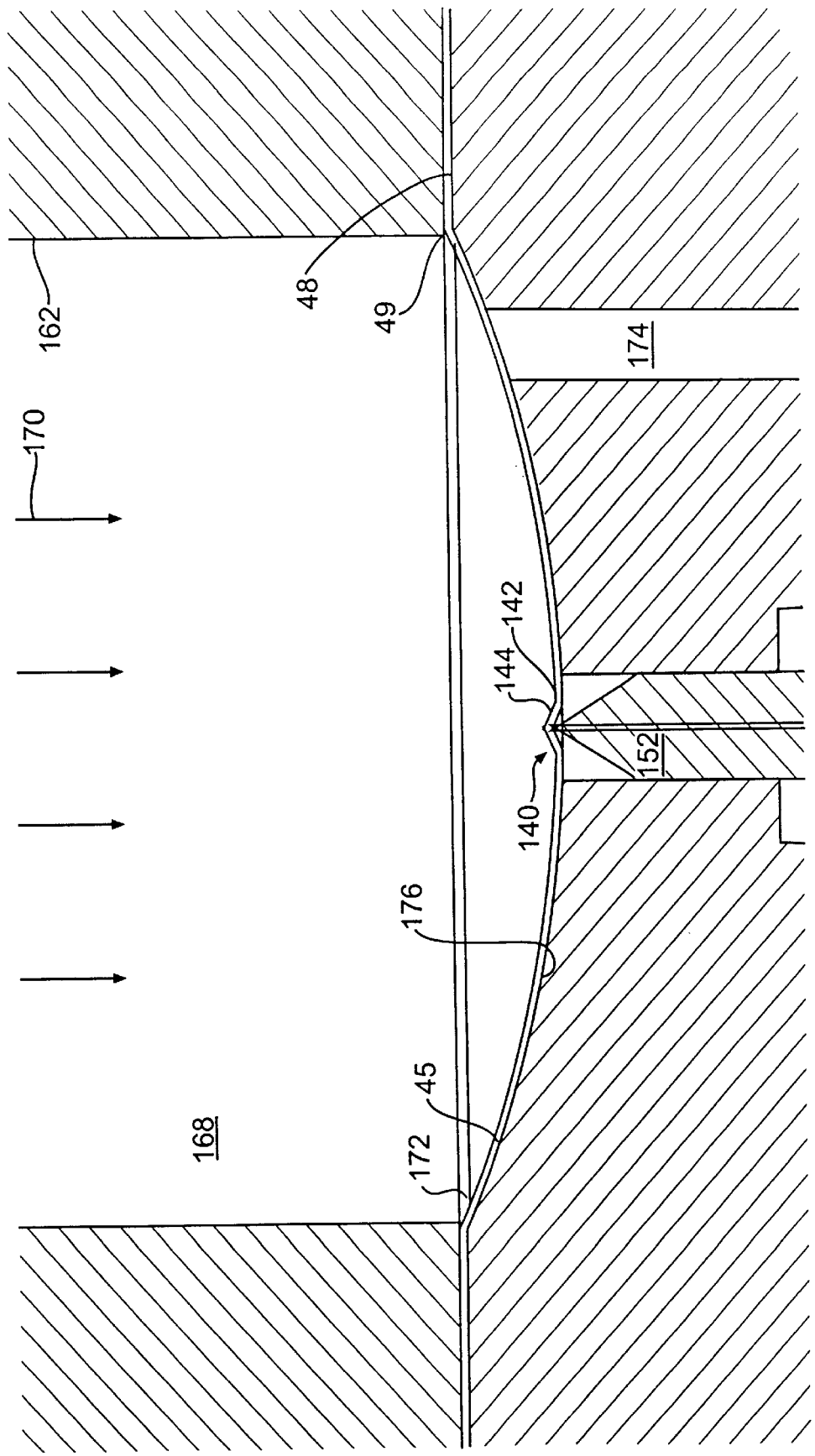
FIG. 14 is a partial cross-sectional view of the apparatus of FIG. 13, illustrating the punch tip engaged with the rupturable portion of the rupture disk.

An apparatus 160 for forming an indentation in the rupturable portion as the rupture disk is formed is illustrated in FIGS. 13 and 14. As is known in the art, rupture disks are typically manufactured from a flat, circular sheet of material known as a rupture disk blank. A portion of the flat sheet of material is subject to a pneumatic or hydraulic pressure to form the dome-shaped rupturable portion.

Apparatus 160 includes a clamp 161 that securely holds the perimeter of a disk blank (identified as dashed line 172). Clamp 161 includes a support 162 and a mold 164. Support 162 includes a central passageway 168 connected to a source of pressurized fluid. When the disk blank is securely fastened in clamp 161, passageway directs the pressurized fluid (as indicated by arrows 170) against the central, unclamped portion of the disk blank. The force of the fluid acts on the unclamped material of the disk blank to displace the unclamped material relative to the clamp and into mold 164.

Mold 164 includes a concave surface 176 that faces the disk blank. As the unclamped material is displaced relative to the clamp, the material engages concave surface 176. The shape of concave surface 176 defines the resulting shape of rupturable portion 45.

Mold 164 includes an opening 150 that houses a member, which is preferably a punch 150. Punch 150 includes a tip 152 that projects from concave surface 176 at or near a point that corresponds to the apex of the domed shape. Preferably, punch 150 is moveable with respect to mold 164 to vary the distance by which punch tip 152 projects from concave surface 176. Mold 164 also includes a vent 174 to allow the pressurized fluid to escape if any problems occur during the formation of the rupture disk.

As illustrated in FIG. 14, punch tip 152 engages the material of the disk blank as it is displaced by the pressurized fluid. The continued force of the fluid on the blank material causes the material to deflect around the punch tip, resulting in the formation of indentation 140. The shape of indentation 140 and of indentation edge 142 may be altered by varying the pressure of the forming fluid. A higher fluid pressure will result in a sharper radius of curvature in indentation edge 142. Conversely, a lower fluid pressure will result in a greater radius of curvature in indentation edge.

By forming the rupture disk into the mold and punch combination, the resulting configuration of the indentation can be precisely controlled. In particular, the depth of the indentation, with respect to the apex of the dome, can be precisely controlled. In addition, the height of the dome with respect to the disk flange, which is another factor that has a significant impact on the burst pressure of the disk, can be precisely controlled. Thus, the reliability and accuracy of the rupture disks can be maintained at a level required for commercial applications.

The present invention contemplates that punch tip 152 may have a cross-sectional shape as illustrated in FIG. 11, and any profile, including, for example, those profiles illustrated in FIGS. 12a–12c. It is further contemplated that the punch tip may be offset from the apex of the domed shape.

The configuration of indentation 140 may also be varied by moving the punch tip and reforming the disk dome. After the disk is formed with a fluid at a first pressure, punch tip 152 may be retracted, partially or fully, with respect to the concave shape of the mold. The rupture disk is then subject to pressurized fluid at a second pressure, which is preferably less than the original forming pressure. The pressurized fluid will again act on the disk to reform the dome. Since the punch tip is no longer engaged with the rupturable portion, the fluid will act to decrease the depth of the indentation relative to the apex of the domed shape. In this manner, the configuration of the indentation may be altered.

The present invention further contemplates that a rupture disk dome having an indentation may be hard stamped from a rupture disk blank. This would be achieved by tooling that is configured to create the desired shape of the rupture disk dome from the rupture disk blank. In this embodiment, the punch is slidably disposed in the tooling. This would allow the depth of the indent, relative to the apex of the dome, to be changed between disks having similar dome heights and shapes. As discussed above, the configuration of the indentation determines the burst pressure of the rupture disk. Thus, the burst pressure of otherwise similar disks may be easily modified to meet the needs of different commercial applications.

Figure 15:
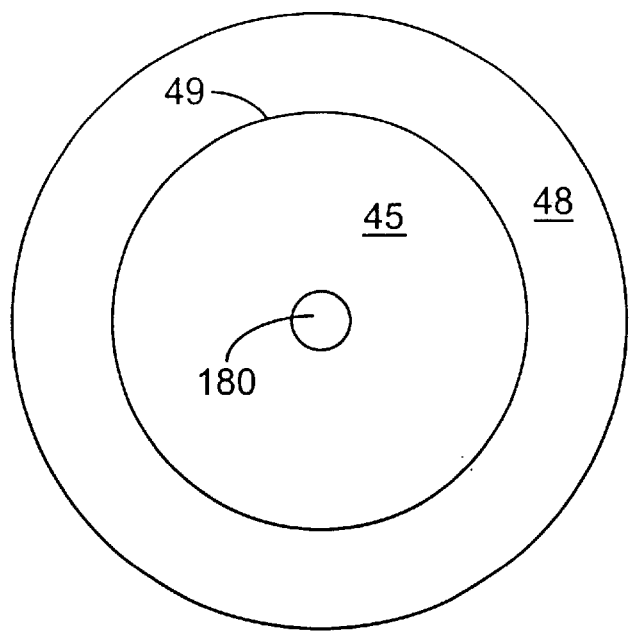
FIG. 15 is a top view of a rupture disk having an opening in the rupturable portion in accordance with the present invention.
Figure 16:
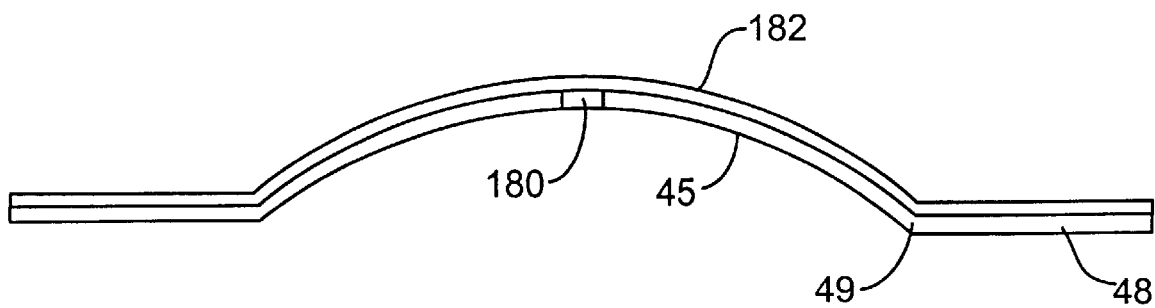
FIG. 16 is a side view of a rupture disk assembly include a rupture disk having an opening in the rupturable portion.

Alternatively, as illustrated in FIGS. 15 and 16, the structural apex formation may be an opening 180 in rupturable portion 45 of the rupture disk. As shown in FIG. 15, opening 180 is preferably centered at the apex of the domed shape of rupturable portion 45. It is contemplated, however, that opening 180 may be offset from the apex of the domed shape.

As illustrated in FIG. 15, opening 180 is preferably circular. The present invention contemplates, however, that opening 180 may have other shapes, such as, for example, a triangle, square, pentagon, hexagon, or oval.

with the methods and apparatus of the present invention improves the burst accuracy of the rupture disk. Rupture disks are manufactured in lots of a given number (typically 5–10 pieces) and all disks within a lot receive a rated rupture pressure based on a statistical sampling of test disks from the same manufacturing lot. Typically, all of the disks within the lot will rupture within 5% of the rated rupture pressure. Thus, to prevent premature rupture of the disk, the operating pressure of the system should not exceed 90% of the rated rupture pressure of the disk. Increasing the accuracy and repeatability of the disk will allow the system to be operated at higher than 90% of the rated pressure of the rupture disk and still achieve an acceptable safety margin.

Rupture disks according to the present invention are considerably more consistent in their actual rupture pressure. The following burst accuracy test data represents comparative testing done on rupture disks having an indentation formed in one of three different methods: (1) free formed indent, (2) mold formed indent; and (3) anvil formed indent.

Burst Accuracy Test 1—Disks with Free Formed Indentation:

This burst accuracy testing was performed on 1.5" disks having an indentation formed with a "free form" method where a tool was engaged with the disk dome during formation, without the use of a mold or other support. Several configurations of disks having various thicknesses, dome heights, and indent depths were burst to determine the actual burst pressure of each disk. The actual burst pressures for each configuration of disk were then compared to determine the burst accuracy for that disk configuration.

| Test No. | Disk Size (inches) | Thickness (inches) | Dome Height (.001") | Indent Depth (.001") | Nbr. of Samples | Avg. Burst Pressure (psi) | Burst Pressure Accuracy* |
|---|---|---|---|---|---|---|---|
| 1 | 1.5 | 0.003 | 126 | 14.2 | 10 | 15.4 | 5.6 |
| 2 | 1.5 | 0.003 | 152 | 5.2 | 8 | 18.1 | 2.3 |
| 3 | 1.5 | 0.007 | 251 | 14.3 | 6 | 150 | 1.0 |
| 4 | 1.5 | 0.007 | 150 | 11 | 7 | 95 | 5.0 |
| 5 | 1.5 | 0.007 | 142 | 1 | 8 | 122 | 4.7 |
| 6 | 1.5 | 0.007 | 256 | 17 | 10 | 155 | 2.8 |
| 7 | 1.5 | 0.01 | 207 | 3.7 | 5 | 318 | 2.0 |
| 8 | 1.5 | 0.01 | 274 | 5.1 | 7 | 401 | 4.7 |
| 9 | 1.5 | 0.01 | 234 | 8 | 10 | 353 | 3.1 |
| 10 | 1.5 | 0.01 | 207 | 3.7 | 5 | 305 | 5.2 |
| 11 | 1.5 | 0.0025 | 152 | 12.5 | 4 | 10.2 | 5.1 |
| 12 | 1.5 | 0.004 | 155 | 12 | 8 | 28.4 | 5.9 |
| 13 | 1.5 | 0.004 | 145 | 3 | 8 | 35.2 | 7 |

*Represents three times the standard deviation in actual burst pressures as a percentage of the average rated burst pressure.

As illustrated in FIG. 16, a liner 182 covers and seals opening 182. Preferably, liner 182 is made of a material that is lighter and more flexible that the material of the rupture disk. Preferably, liner 182 covers the entire rupture disk, although liner 182 may only extend a short distance past opening 182. Liner 182 may be attached with an adhesive material or through welding to any part of the rupture disk, including the rupturable portion and/or the flange.

It has been found, as evidenced in the examples below, that indenting the dome of the disk at the apex in accordance Accuracy Test 2—Disks with Mold Formed Indentation:

This burst accuracy testing was performed on 1.5" disks having an indentation formed with a mold as described in greater detail above. Several configurations of disks having various thicknesses, dome heights, and indent depths were burst to determine the actual burst pressure of each disk. The actual burst pressures for each configuration of disk were then compared to determine the burst accuracy for that disk configuration.

| Test No. | Disk Size (inches) | Thickness (inches) | Dome Height (.001") | Indent Depth (.001") | Nbr. of Samples | Avg. Burst Pressure (psi) | Burst Pressure Accuracy* |
|---|---|---|---|---|---|---|---|
| 1 | 1.5 | 0.003 | 289 | 8.9 | 12 | 38.2 | 2.8 |
| 2 | 1.5 | .003 | 136 | 10.4 | 20 | 15.1 | 2.6 |
| 3 | 1.5 | .006 | 140 | 6.7 | 20 | 75.7 | 2.9 |
| 4 | 1.5 | 0.007 | 144 | 10.7 | 10 | 114 | 1.9 |
| 5 | 1.5 | 0.007 | 268 | 2.7 | 5 | 215 | 13 |
| 6 | 1.5 | 0.0025 | 143 | 1.2 | 5 | 14.7 | 4.6 |
| 7 | 1.5 | 0.003 | 289 | 8.9 | 12 | 38.8 | 2.2 |
| 8 | 1.5 | 0.003 | 289 | 9.3 | 8 | 38.3 | 2.9 |
| 9 | 1.5 | 0.003 | 289 | 8.8 | 7 | 38.5 | 2.9 |
| 10 | 1.5 | 0.003 | 291 | 3.7 | 7 | 46.4 | 2.4 |
| 11 | 1.5 | 0.003 | 291 | 2.8 | 6 | 58.1 | 2.7 |
| 12 | 1.5 | 0.003 | 291 | 9.1 | 5 | 37.6 | 3.3 |
| 13 | 1.5 | 0.003 | 287 | 7.1 | 10 | 51.3 | 2.1 |

*Represents three times the standard deviation in actual burst pressures as a percentage of the average rated burst pressure.

Burst Accuracy Test 3—Disks with Anvil Formed Indentation:

This burst accuracy testing was performed on 1" disks having an indentation formed with an anvil after formation of the disk dome, as described in greater detail above. Several configurations of disks having various thicknesses, dome heights, and indent depths were burst to determine the actual burst pressure of each disk. The actual burst pressures for each configuration of disk were then compared to determine the burst accuracy for that disk configuration.

burst accuracy than disks having indentations formed with other methods.

Adjusting other design parameters of the disk, such as, for example, the location of the score line, may provide additional improvements upon the burst accuracy of the disk. The present invention contemplates that a rupture disk having a structural apex formation consistent with the present invention and a score line in the transition area of the disk will also have greatly improved burst accuracy characteristics when compared to the burst accuracy characteristics of conventional rupture disks.

| Test No. | Disk Size (inches) | Thickness (inches) | Dome Height (.001") | Indent Depth (.001") | Nbr. of Samples | Avg. Burst Pressure (psi) | Burst Pressure Accuracy* |
|---|---|---|---|---|---|---|---|
| 1 | 1 | 0.003 | 190 | 23.6 | 9 | 22.56 | 2.59 |
| 2 | 1 | 0.003 | 190 | 25.5 | 9 | 22.43 | 2.5 |
| 3 | 1 | 0.003 | 190 | 27.6 | 9 | 22.40 | 2.92 |
| 4 | 1 | 0.003 | 190 | 29.5 | 9 | 22.39 | 1.95 |
| 5 | 1 | 0.003 | 190 | 29.5 | 9 | 22.26 | 2.79 |
| 6 | 1 | 0.003 | 190 | 31.4 | 9 | 21.79 | 2.79 |
| 7 | 1 | 0.004 | 190 | n/a | 10 | 50.63 | 2.20 |
| 8 | 1 | 0.003 | 250 | n/a | 5 | 35.24 | 4.3 |
| 9 | 1 | 0.011 | 190 | n/a | 5 | 310.1 | 3.8 |
| 10 | 1 | 0.011 | 250 | n/a | 5 | 460.3 | 1.0 |
| 11 | 1 | 0.007 | 220 | n/a | 5 | 151.4 | 3.9 |

*Represents three times the standard deviation in actual burst pressures as a percentage of the average rated burst pressure.

Burst Accuracy Summary

The following table summarizes the foregoing test data. This table presents the average of burst accuracies for the different methods of forming an indentation in the dome of the rupture disk.

| Indent Forming Method | Average Burst Accuracy* |
|---|---|
| Free Formed Indent | 4.18 |
| Mold Formed | 2.66 |
| Anvil Formed | 2.79 |

*Represents an average of the burst accuracies as determined in the above testing.

As shown in the above testing and summarized in the preceding table, rupture disks having an indentation formed in accordance with the present invention have a far greater Another benefit of the present invention is a reduced damage safety ratio. The damage safety ratio of a disk is determined by dividing the actual burst pressure of a damaged disk by the rated pressure of the disk. The following data represents the damage ratio of rupture disks made according to the present invention with different types of damage:

Damage Test:

The following damage testing was performed on 1" rupture disks according to the present invention. These rupture disks were made from 0.004" Ni formed at 275 psig with a resulting 0.190" crown height. The average burst pressure of the disk batch tested in an undamaged state was 50.6 psig. According to ASME standards, an acceptable burst pressure tolerance is ±5 psig of the rated burst pressure. Thus, for the rupture disks of this test, the minimum acceptable burst pressure is 48.1 psig and the maximum acceptable burst pressure is 53.1 psig.

| Damage Type* | Average Burst Pressure (psig) | Actual Burst Pressure (psig) | Damage Ratio |
|---|---|---|---|
| None | 50.6 | 50.5 | 1.00 |
| None | 50.6 | 50.5 | 1.00 |
| Blunt damage** to disk dome behind hinge, so that disk dome contacts midpoint of the knuckle | 50.6 | 51.0 | 1.01 |
| Blunt damage to disk dome behind hinge, so that disk dome does not contact the knuckle | 50.6 | 51.0 | 1.01 |
| Blunt damage to the transition area behind the hinge | 50.6 | 51.0 | 1.01 |
| Blunt damage to the transition area opposite the hinge | 50.6 | 51.0 | 1.01 |
| Sharp damage*** to the transition area behind the hinge | 50.6 | 49.7 | 0.98 |
| Sharp damage to the transition area opposite the hinge | 50.6 | 50.5 | 1.00 |
| Sharp damage to the transition area over one of the stress risers | 50.6 | 51.0 | 1.01 |
| Sharp damage on score line opposite the hinge | 50.6 | 51.0 | 1.01 |
| Blunt damage across score line opposite the hinge | 50.6 | 42.5 | 0.84 |
| Blunt damage across center of dome | 50.6 | 25.0 | 0.49 |
| Sharp damage to dome 3.75 mm from central indentation | 50.6 | 35.0 | 0.69 |
| Sharp damage to dome 7.5 mm from central indentation | 50.6 | 45.0 | 0.89 |

*A disk is considered damaged when the dome of the disk is physically altered to include a feature that is visible on both sides of the rupturable portion of the disk.
**Blunt damage to the disk was inflicted using a generally flat object with a circular profile, for example a hammer with a diameter of approximately 0.75".
***Sharp damage to the disk was inflicted using a tool having a rectangular profiled tip, for example a screw driver with dimensions 0.200" × 0.040".

As shown in the above testing, a rupture disk made in accordance with the present invention has a damage safety ratio of less than about 1. Thus, if a rupture disk according to the present invention is damaged prior to or after installation, the disk will still rupture at a pressure that is no greater than the maximum acceptable burst pressure of the disk (which, in this example, is the rated burst pressure plus 5%).

As mentioned previously, the disclosed pressure relief assembly may be used in a pressurized system containing either a pressurized gas or a pressurized liquid. In accordance with the present invention, a rupture disk is provided that, when burst, has a low flow resistance, $K_r$, in both a liquid application and a gas application.

The flow resistance, $K_r$, of a rupture disk determines the rate at which the rupture disk will relieve fluid to reduce the pressure of a system. The flow resistance is a function of the pressure drop, or velocity head loss, over the burst rupture disk. A large velocity head loss results in a large $K_r$ and, thus, a lower fluid release rate. The American Society of Mechanical Engineers (ASME), standard ASME PTC 25, have established performance testing requirements for fluid relief rates of a rupture disk.

Rupture disks made in accordance with the present invention have a low $K_r$ in both liquid and gas environments. The $K_r$ rating of a rupture disk is determined through a standardized procedure. In one method, the $K_r$ rating of a particular disk design is determined by bursting three samples of three different sizes of the rupture disk at the minimum pressure rating for the disk. The $K_r$ value for each of the nine burst disks is then determined. Next, the average and the standard deviation of the nine $K_r$ values is determined. The $K_r$ rating for the rupture disk is equal to the average of the nine $K_r$ values plus three times the standard deviation of the nine $K_r$ values. The following test data represents testing done on disks made in accordance with the present invention in a gas environment according to ASME standards:

| Disk Size | Test No. | $K_r$ Value |
|---|---|---|
| 1.0" | 1 | 0.256 |
| 1.0" | 2 | 0.266 |
| 1.0" | 3 | 0.271 |
| 1.5" | 1 | 0.329 |
| 1.5" | 2 | 0.321 |
| 1.5" | 3 | 0.285 |
| 2.0" | 1 | 0.314 |
| 2.0" | 2 | 0.270 |
| 2.0" | 3 | 0.282 |
| Average | | 0.288222 |
| Standard Deviation | | 0.022074 |
| $K_r$ Rating | | 0.354444 |

As shown in the above testing, a rupture disk according to the present invention has a low $K_r$ in a gas environment. While the $K_r$ for a liquid environment may be slightly higher, the present invention nonetheless provides for a low $K_r$ value under liquid conditions. Preferably, the $K_r$ of the rupture disk according to the present invention is less than about 1.6 in both gas and liquid applications. More preferably, the $K_r$ of the rupture disk according to the present invention is less than about 1.0 in both gas and liquid applications. Even more preferably, the $K_r$ of the rupture disk according to the present invention is less than about 0.7 in gas and/or liquid applications.

An additional benefit of the present invention is a rupture disk design that provides low rupture pressures in a liquid application. Conventional non-fragmenting rupture disks are unsuited for low pressure liquid applications since the disks will not open fully in such an application. The rupture disk of the present invention, however, will meet ASME performance standards in liquid applications having operating pressures of under 100 psig.

It will be apparent to those skilled in the art that various modifications and variations can be made in the rupture disk assembly of the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A rupture disk to be sealingly engaged with a pressurized system, comprising:
    an annular flange; and
    a rupturable portion configured to reverse when exposed to a fluid having a predetermined pressure, the rupturable portion having a domed shape with a convex surface and a corresponding concave surface and an indentation disposed at the apex of the dome, the indentation including an annular crease formed in at least one of the concave and convex surfaces, wherein reversal of the rupturable portion initiates at a point along the annular crease.

2. The rupture disk of claim 1, wherein the indentation is centered at the apex of the domed shape.

3. The rupture disk of claim 1, wherein the indentation is generally circular.

4. The rupture disk of claim 1, wherein the crease is in the concave surface.

5. The rupture disk of claim 1, wherein the crease is centered about the apex of the domed shape.

6. A rupture disk to be sealingly engaged with a pressurized system, comprising:

an annular flange; and a rupturable portion configured to rupture when exposed to a fluid having a predetermined pressure, the rupturable portion having a domed shape with a convex surface and a corresponding concave surface and an indentation disposed at the apex of the dome, the indentation including a substantially planar section.

7. The rupture disk of claim 6, wherein the indentation is centered at the apex of the domed shape.

8. The rupture disk of claim 7, wherein the indentation is generally circular.

9. A rupture disk to be sealingly engaged with a pressurized system, comprising:

an annular flange; and a rupturable portion configured to rupture when exposed to a fluid having a predetermined pressure, the rupturable portion having a domed shape with a convex surface and a corresponding concave surface and an indentation disposed at the apex of the dome, the indentation including a first section and a second section, wherein the material thickness of the first section is less than the material thickness of the second section.

10. The rupture disk of claim 9, wherein the indentation is centered at the apex of the domed shape.

11. The rupture disk of claim 10, wherein the indentation is generally circular.

12. The rupture disk of claim 9, wherein the first section forms a crease in at least one of the concave and convex surfaces.

13. The rupture disk of claim 12, wherein the first section is generally circular and is centered about the apex of the domed shape.

* * * * *